United States Patent [19]

Noiri et al.

[11] Patent Number: 5,838,680
[45] Date of Patent: Nov. 17, 1998

[54] ATM CELL SWITCH WITH MASTER AND SLAVE DEMULTIPLEXER MODULES AND REDUCED CURRENT FLUCTUATIONS

[75] Inventors: Akira Noiri; Tatsuhiko Kitamura; Mitsuhiro Murasugi; Hiromichi Wada, all of Tokyo, Japan

[73] Assignee: OKI Electric Industry, Co., Ltd., Tokyo, Japan

[21] Appl. No.: 511,890

[22] Filed: Aug. 7, 1995

[30] Foreign Application Priority Data

Aug. 12, 1994 [JP] Japan ................................. 6-190341

[51] Int. Cl.$^6$ ................................................. H04L 12/56
[52] U.S. Cl. .......................................... 370/395; 370/505
[58] Field of Search .............................. 370/60.1, 60, 61, 370/94.1, 94.2, 94.3, 350, 503, 505, 506, 507, 509, 512, 518, 520, 389, 395, 412, 413, 428, 535, 251; 375/355, 356, 362

[56] References Cited

U.S. PATENT DOCUMENTS

| 4,814,974 | 3/1989 | Narayanan et al. | 340/825.51 |
| 4,947,388 | 8/1990 | Kuwahara et al. | 370/395 |
| 5,361,255 | 11/1994 | Diaz et al. | 370/60 |
| 5,375,121 | 12/1994 | Nishino et al. | 370/94.2 |
| 8,702,008 | 10/1972 | Groth | 370/449 |

OTHER PUBLICATIONS

Inoue et al, "A Study on a Large Scale ATM Switching System", Tech. Report of the Institute of Electronics, Information and Communications Engineers, SSE90–85 pp. 19–24.

Okamoto et al, "A Large Scale ATM Switch Using Partial Cell Switching Method", Tech.Report of the Institute of Electronics, Information and Communications Engineers, SSE93–68, IN93–75, CS93–91, Oct. 1993, pp. 25–30.

Doi et al, "A 160 Gbit/s ATM Switch Using Dynamic Link Speed Controlled Switch Architecture", Tech. Report of the Institute of Electronics, Information and Communic. Engineers, SSE93–69, IN93–76, CS93–92, Oct. 1993, pp.31–36.

*Primary Examiner*—Dang Ton
*Attorney, Agent, or Firm*—Spencer & Frank

[57] ABSTRACT

An ATM cell switch has a cell multiplexer connected by a shared bus to a cell demultiplexer. In a first aspect of the invention, writing of cell data in the cell multiplexer is staggered to even out current consumption. In a second aspect, the cell multiplexer has input processors enabling it to receive cell data from input ports with different data rates, and the cell demultiplexer has output processors enabling it to send cell data to output ports with different data rates. In a third aspect, the multiplexing sequence on the shared bus is periodically altered to avoid favoring any one input port. In a fourth aspect, test pattern data are placed on the shared bus to monitor bus integrity. In a fifth aspect, the cell demultiplexer is divided into master and slave demultiplexer modules, which are coupled to different, parts of the shared bus.

27 Claims, 18 Drawing Sheets

ATM CELL SWITCH WITH MASTER AND SLAVE DEMULTIPLEXER MODULES AND REDUCED CURRENT FLUCTUATIONS

BACKGROUND OF THE INVENTION

This invention relates to an asynchronous-transfer-mode cell switch.

Asynchronous transfer mode (hereinafter ATM) is a protocol employed in digital communication networks, under which data are transmitted in fifty-three-byte packets called cells. Each cell consists of a five-byte header and forty-eight bytes of payload data. An ATM cell switch routes cells from input ports to output ports according to address information in the headers.

Among various ATM switching architectures, the shared-bus architecture is easily implemented with comparatively inexpensive, low-power complementary metal-oxide-semiconductor (CMOS) integrated circuits (ICs). An ATM switch of the shared-bus type has a multiplexer that multiplexes cells from all the input ports onto a high-speed bus, using a time-division multiplexing scheme. A demultiplexer scans the header information on the bus and demultiplexes the cells to the appropriate output ports. To absorb fluctuations in cell traffic, the demultiplexer is provided with an output buffer memory. The demultiplexer can be divided into a plurality of identical modules, e.g. one module per output port, each with its own output buffer.

Despite its simplicity, this architecture gives rise to a number of problems. A first problem occurs on the multiplexer's power supply lines. The multiplexer comprises a set of input memories that store cells received from different input ports, and a selector that selects the input memories in turn. The problem arises from the writing of cell data into the input memories.

Cells from different input ports can be written into different input memories simultaneously. If the input ports are mutually in-phase, for example, then cell data will be written into all the input; memories at once, followed by a pause in which no writing activity occurs until more input cell data have accumulated. This leads to pronounced fluctuations in current consumption, because memory circuits generally draw much more current when being written to than when idle or being read.

Large fluctuations in current consumption can produce undesirable changes in voltage levels on power lines. These can in turn produce ambiguous signal levels inside the multiplexer, or on signal lines connected to tile multiplexer. Large, rapid current fluctuations can also create voltage spikes and other electrical noise on the power supply lines, and this noise can contaminate signal lines, leading to data errors or circuit malfunctions.

A simple solution to this problem would be to provide a strongly regulated power supply capable of maintaining a constant voltage level despite current fluctuations. This solution is unattractive, however, because it requires a large and expensive power supply circuit.

A second problem concerns the number of input/output (I/O) terminals of integrated circuits. To begin with, the high-speed bus is usually very wide, data widths of from forty to one hundred sixty bits being common at present. Any IC connected to the entire bus needs a corresponding number of I/O terminals for bus data alone.

A demultiplexer IC may require many further data, address, and control signal lines for connection to external output buffer memory. The size of the output buffers depends on performance requirements, but it is not, unusual for each output port to need enough buffer memory to store, for example, sixty-four cells, and the required amount, may be much larger (e.g. several thousand cells) . If the buffer requirement is large, or if different demultiplexer ICs share a large common buffer memory, it becomes impossible to implement both the demultiplexing functions and output buffer functions in the same integrated circuits.

A demultiplexer IC also requires signal lines for connections to output ports. The total number of bus, buffer, and output port signal lines can easily exceed the number of I/O terminals (leads) available in a single integrated circuit. In that case, the demultiplexing functions must be divided among different integrated circuits, e.g. by coupling one IC to half of the bus lines and another IC to the remaining half, but then the demultiplexing function becomes difficult to coordinate. A particular problem is that a cell header may be input partly to one IC and partly to another IC. In any case, the I/O count of the integrated circuits places unwanted constraints on the design of the ATM cell switch, including constraints on bus width and constraints on the amount of output buffer space.

Another consequence of a wide bus is reduced circuit reliability. The more bus data lines there are, the greater becomes the risk of a faulty connection between a data line and a multiplexer or demultiplexer IC, or the risk of a faulty line driver or receiver in the IC. If such a fault occurs, the large number of bus lines also makes the fault difficult to locate.

The fact that the selector in the multiplexer selects the input memories in turn implies that these input memories must receive cell data at substantially the same rate, which creates a further problem. Digital communication networks employ many data rates, including such internationally recommended rates as 155.52 megabits per second (Mbps) and 622.08 Mbps (rates known as STM-1 and STM-4). Conventional ATM switching systems of the shared-bus type have difficulty accommodating input lines with different data rates; they require modification of the physical interface between the cell switch and input/output ports, e.g. by insertion of extra circuits for conversion of data width and data rate.

A further problem is the problem of congestion, which arises when a large amount of cell traffic, becomes concentrated on a single output port. Brief traffic surges can be absorbed by the output buffer assigned to the port. If the situation persists, however, the output buffer will become eventually full, forcing the switch to drop cells addressed to that output port until space becomes available in the buffer; that is, until one of the cells stored in the buffer is output from the port.

Although the ATM protocol tolerates such cell loss to a certain degree, the ATM cell switch must generally guarantee, that it will not exceed a fixed maximum cell loss rate per communication channel. To stay within this limit, under congested conditions it is advantageous to drop cells from all input ports with equal probability, without favoring any particular input port. Unfortunately, conventional shared-bus cell switching systems have a strong tendency to favor certain input ports, due to naturally-occurring synchronization between output from the output ports and the multiplexing sequence of the input ports.

Another problem concerns the transmission of additional information, other than cell header and payload data, through the ATM cell switch. This information is generated at the input ports and removed at the output ports. It specifies, for example, the above-mentioned maximum cell loss rate, or a maximum allowable switching delay time. Such additional information is commonly inserted between cells and transmitted as part of the cellstream. In effect, the cell length is increased from fifty-three bytes to fifty-four bytes or more.

One disadvantage of this scheme is that the amount of information that can be efficiently added depends on the width of the cell data paths in the cell switch. It is wasteful, for example, to use a wide data path to transmit only a small amount of additional information.

A second disadvantage is that while the cells are lengthened, the number of cells that must be transmitted per unit time does not change. When additional information is inserted in the cellstream, it therefore becomes necessary to increase the internal cell data rate, requiring additional hardware such as a clock rate converter or second clock source, and a data buffer.

SUMMARY OF THE INVENTION

It is accordingly an object of the present invention to reduce fluctuations in current consumption associated with the multiplexing of ATM cells onto a shared bus.

Another object of the invention is to remove ATM cell switch design constraints arising from the number of I/O terminals available per integrated circuit.

An additional object is to simplify the demultiplexing of cells from the shared bus by integrated circuits which are coupled to different parts of the shared bus.

Still another object is to monitor the integrity of the shared bus.

Yet another object, is to connect an ATM cell switch to input or output ports having different data rates.

A further object is to assure equal probabilities of cell loss for all input ports.

A still further object is to transmit an arbitrary amount of additional information through an ATM cell switch without altering the data rate of the ATM cellstream.

The invented ATM cell switch has a cell multiplexer that multiplexes cell from a plurality of input ports onto a shared bus, and a cell demultiplexer that demultiplexes the cells from the shared bus to output ports specified by header information in the cells.

According to a first aspect of the invention, the cell multiplexer has a plurality of input memories for temporarily storing the cells before they are placed on the shared bus, a write pulse distributor for distributing write pulses to these input memories, and a pulse distribution controller for staggering the write pulses so that the cell multiplexer draws current at a substantially even rate.

According to a second aspect of the invention, the cell multiplexer also has input processors, each receiving cells from a group of input ports, for converting the cells to a uniform data rate and data width and writing the cells into respective input memories. A group of input ports may consist of a single high-speed input port, or two or more lower-speed input ports. The cell demultiplexer has output processors which serve groups of output ports in a similar way, performing processing reverse to that of the input processors.

According to a third aspect of the invention, the cell multiplexer has an output sequencer that selects the multiplexing sequence on the shared bus, and periodically alters this sequence so that under congested cell traffic conditions, no one input port receives favored treatment.

According to a fourth aspect of the invention, the cell multiplexer has a test pattern generator that generates test pattern data, and a selector that selects the test pattern data and multiplexed cell data in turn, placing the selected data on the shared bus. The cell demultiplexer checks the test pattern data to monitor the integrity of the shared bus.

According to a fifth aspect of the invention, the shared bus is divided into two or more parts and the cell demultiplexer is divided into master and slave demultiplexer modules. The cell multiplexer has an output sequence converter that rearranges the data in each cell so that all header data are placed on one part of the shared bus. The master demultiplexer modules read the headers from this part of the shared bus and demultiplex cell data from this part or another part of the shared bus. The slave demultiplexer modules demultiplex cell data from other parts of the shared bus, either under control of the master demultiplexer modules or by reading the header information for themselves. Cell data demultiplexed by the slave demultiplexer modules may be returned to the master demultiplexer modules for reassembly of cells, or output directly from the slave demultiplexer modules to the output ports.

DETAILED DESCRIPTION OF THE INVENTION

Embodiments of the invention will he described with reference to the attached illustrative drawings.

Figure 1:
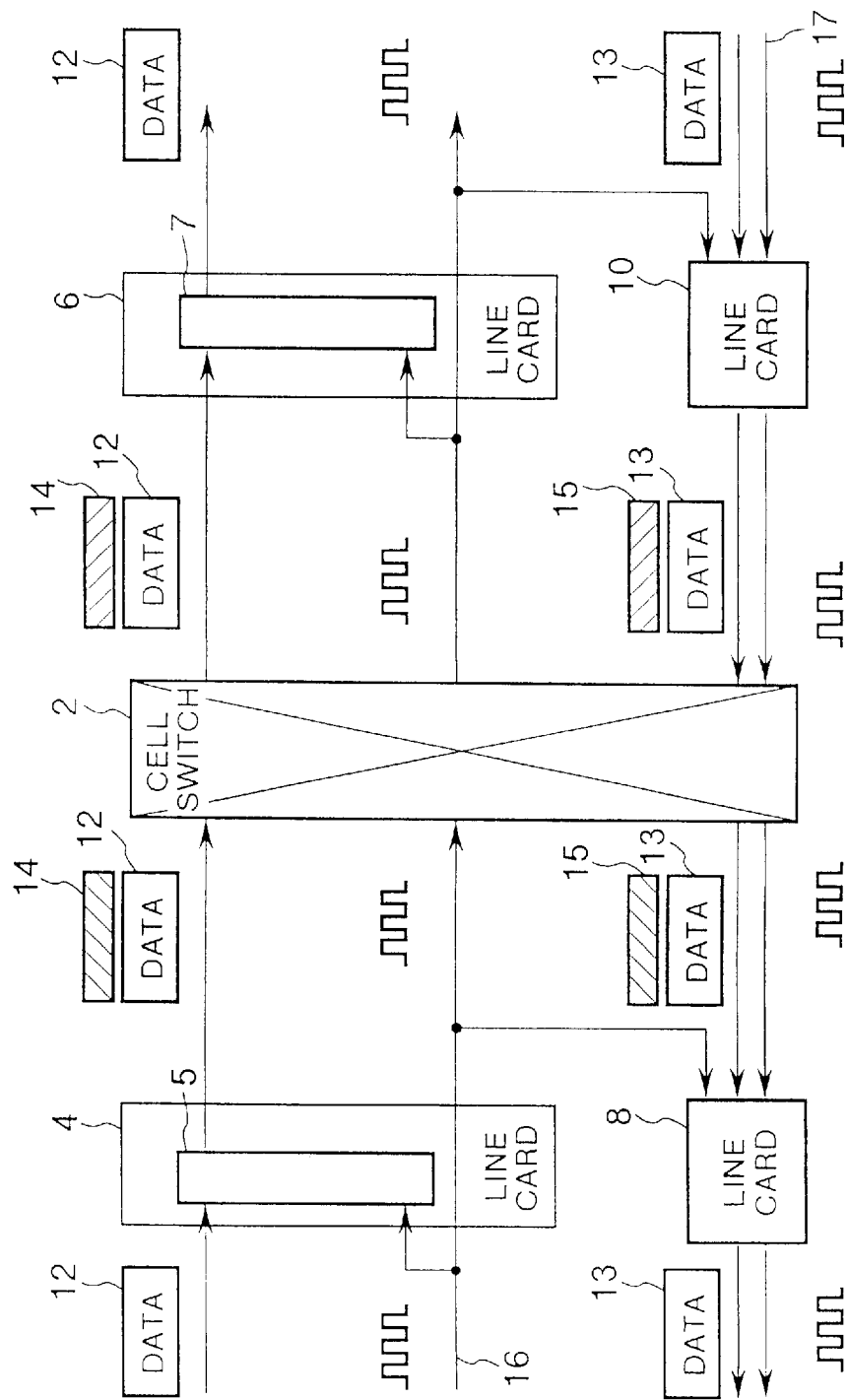
FIG. 1 is a simplified block diagram of an ATM switching system.

FIG. 1 is a simplified block diagram of an ATM switching system comprising a novel ATM cell switch 2, showing four of the connected input and output ports. Line card 4 is an input port, provided with an input buffer 5 and other well-known facilities, not explicitly shown. Line card 6 is an output port, likewise provided with an output buffer memory 7 and other facilities. Line cards 8 and 10 are similar to line cards 4 and 6, line card 10 being an input port and line card 8 an output port. The ATM cell switch routes ATM cells 12 and 13 and additional information 14 and 15 between the input and output ports.

Line card 4 receives an ATM cell 12, stores the received cell data temporarily in the buffer 5, generates additional information 14 pertaining to the cell, and sends both the cell data 12 and additional information 14 in parallel to the ATM cell switch 2. Line card 4 may also convert the data width: for example, a serial data signal arriving at 155.52 Mbps can be converted to an eight-bit parallel signal with a rate of 19.44 Mbps on each bit line, so that the ATM cell switch 2 only has to sample the bit lines at a rate of 19.44 megahertz (MHz).

There is no restriction on the type of additional information 14 generate. The additional information 14 may include performance parameters such as the cell loss rate and switching delay mentioned earlier, address (routing tag) information, or other information.

The ATM cell switch 2 routes the cell 12 and additional information 14 as specified by the header. In the drawing, cell 12 and its additional information 14 are routed to line card 6 and stored in buffer 7. Line card 6 then discards the additional information 14 and transmits the cell data 12 to another point in the communication network (not shown).

Cell 13 is similarly received at line card 10, routed together with additional information 15 to line card 8, and transmitted onward, without the additional information 15, from line card 8.

A novel feature of the ATM cell switch 2 is that the additional information 14 and 15 is routed in parallel with the cell data 12 and 13. This scheme permits an arbitrary amount of additional information to be added to the cell data without increasing the data rate of the cell data. The ATM cell switch 2 and line cards 4, 6, 8, and 10 can accordingly all operate using the same system clock signal 16. In particular, this clock signal 16 can control both the rate at which data are read into and out of the buffers 5 and 7 in the line cards 4 and 6, and the data-handling rate in the ATM cell switch 2 itself.

In the following description reference numeral 12 will be used to refer to an arbitrary cell 12, or to cell data in general, and reference numeral 14 to refer to additional information. When there is no need to distinguish between cell data and additional information, the term cell data will be used to refer to both.

Figure 2:
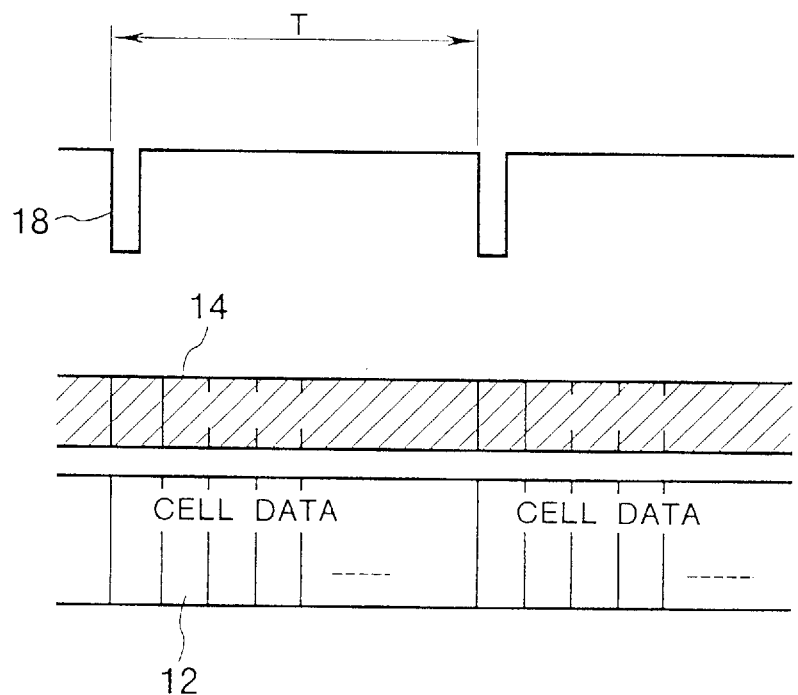
FIG. 2 illustrates parallel routing of cell data and additional information pertaining to the cells.

FIG. 2 illustrates the flow of data at an arbitrary point between an input port and an output port in FIG. 1. The flow is divided into frames and synchronized by a frame synchronization signal 18, which is derived from the system clock signal 16 in FIG. 1. Each frame consists of a stream of cells 12, and a parallel stream of additional information 14. The additional information 14 is not inserted into the cellstream, and hence does not affect the data rate of the cell stream. The cell data 12 and additional information 14 are, however, routed and switched together.

Figure 3:
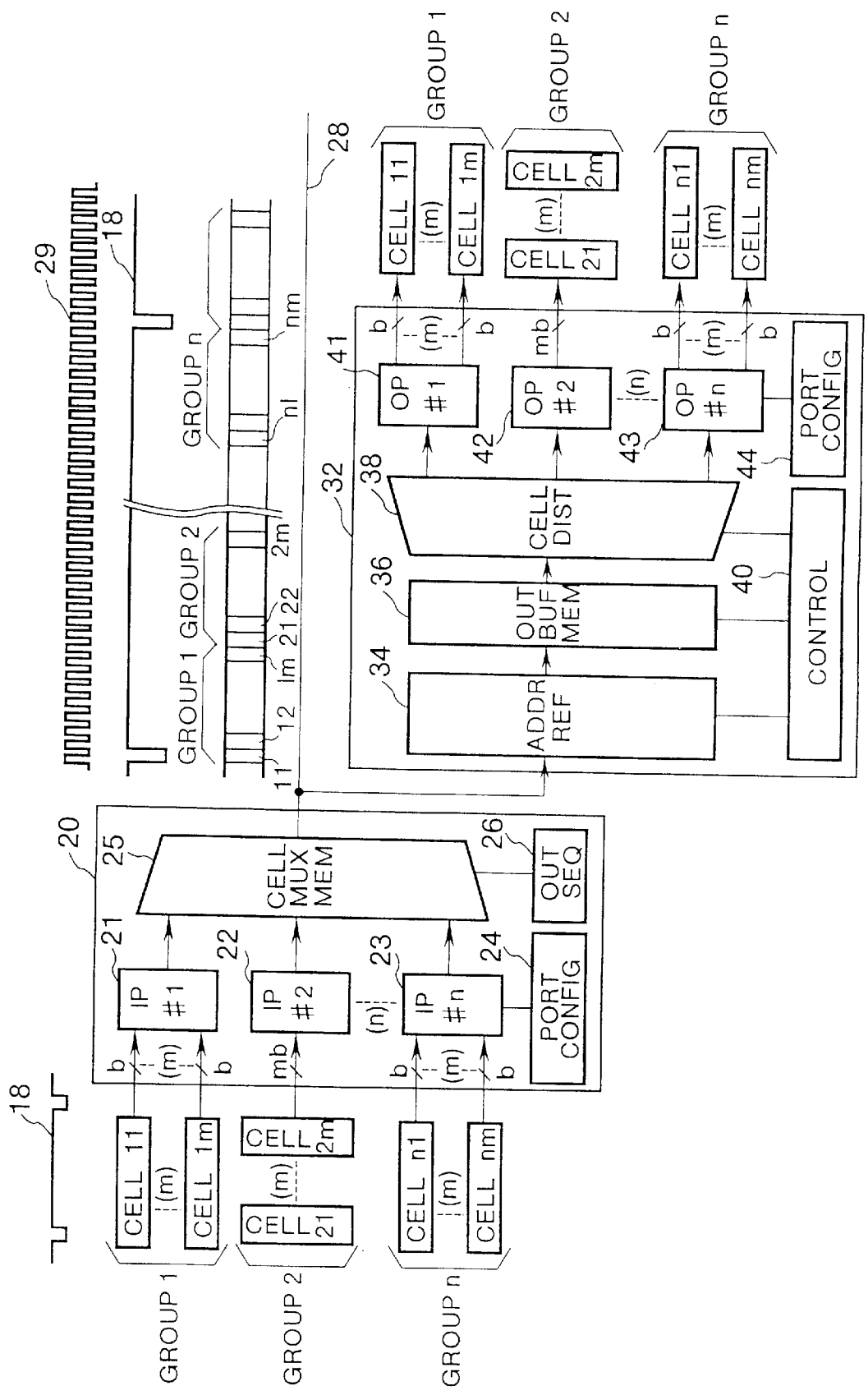
FIG. 3 is a block diagram of the invented ATM cell switch illustrating grouping of input and output ports.

FIG. 3 shows the internal structure of the ATM cell switch 2, with particular attention to the interfaces to input and output ports.

The input ports need not all have the same data rate, but they can often be grouped in such a way that different groups have the same aggregate data rate. In FIG. 3 there are n groups of input ports, of which groups one, two, and n are shown (n is an arbitrary positive integer). Group one consists of m input ports each having a certain data rate v. Group two consists of one input port having a faster data rate mv. Group n, like group one, consists of m input ports with data rate v. The aggregate data rate of each of these three groups of input ports is mv.

As an example of these data rates, v might be 155.52 Mbps (STM-1) and mv might be 622.08 Mbps (STM-4), in which case m=4. Of course, the invention is not restricted to any particular values of m, n, and v.

In FIG. 3 input of cells at input, port groups one and n is shown as being synchronized with the frame synchronization signal 18; during each frame interval, m cells are being received simultaneously at the m input ports in each of these two groups (cells 11 to 1m in group one, and cells n1 to nm in group n). During this same interval, m cells are being received one after the other at, the single input port in group two (cells 21 to 2m).

FIG. 3 also shows the cells in groups one and n being input with a data width of b bits per input port, while the data width of the single input port in group two is mb bits. In this configuration all input bit lines can be sampled at the same rate. This is not, however, a necessary condition; the invented cell switch can use different sampling rates for different input ports. Nor is it necessary for the cell inputs at different input ports to be mutually synchronized as shown in FIG. 3.

The ATM cell switch has a cell multiplexer 20 comprising n input processors (IPs), of which a first input. processor 21, second input processor 22, and n-th input processor 23 are shown. The cell multiplexer 20 also comprises a port configuration unit 24, a cell multiplexing memory 25, an output sequencer 26, and other facilities which will be illustrated later. Each input processor is coupled to a corresponding group of input ports. The input processors receive cells and their additional information 14 at various data rates and data widths, convert all cell data and additional information 14 to a uniform data rate and data width, and write the cells and their additional information 14 at this uniform data rate and data width into the cell multiplexing memory 25. The cell multiplexer 20 is preferably implemented as a single integrated circuit.

The input processors 21, 22, and 23 are controlled by the port, configuration unit 24, which has registers that store information about the data rate and data width of each input port to which each input processor is connected. The input processors operate according to this information. The port configuration unit 24 also configures the connections of the input processors to the input/output terminals of the cell multiplexer 20, by controlling switches not explicitly shown in the drawing.

Information about input port configuration, data rates, and data widths is programmed into the port configuration unit 24 by hardware or software means not explicitly shown in the drawing. (Examples of such means include switches, jumpers, or the downloading of data into a non-volatile memory.) In this way the ATM cell switch can be set up to handle a variety of different types of input ports, without the need to insert extra adapter hardware to convert data rates or data widths.

It is not necessary for all groups of input ports to have the same aggregate data rate. If one group receives less data than the other groups, its input processor can make up the difference by inserting dummy cells into the cellstream, to align the data rate with the data rate of other groups.

From the cell multiplexing memory 25, the cell and their additional information are multiplexed by being read out onto a shared bus 28 in synchronization with the frame synchronization signal 18, and with a cell clock signal 29. The multiplexing sequence is controlled by the output sequencer 26. In the example shown, m cells from group one (cells 11 to 1m) are followed by m cells from group two (cells 21 to 2m), and so on through group n.

From the shared bus 28, the cells are read into a cell demultiplexer 32 comprising an address reference unit 34, an output buffer memory 36, a cell distributor 38, a control circuit 40, a plurality of output processors (of which a first output processor 41, second output processor 42, and n-th output processor 43 are shown), and a port configuration unit 44. Each output processor (OP) is coupled to a group of output ports. The grouping of output ports is shown as being similar to the grouping of input ports: there are n groups in all, of which the first and n-th groups each consist of m output ports with data rates of v, while the second group consists of just one output port with a data rate of mv.

The output processors are configured by the port configuration unit 44, which is programmed with information about output port connections, data rates, and data widths. The port configuration unit 24 and port configuration unit 44 can be programmed with different information. It is not, necessary for the output ports to be grouped or configured in the same way as the input ports.

The address reference unit 34 reads the header of each cell on the bus, passes address information from the cell header to the control circuit 40, and passes the cell data to the output buffer memory 36. The cell data are stored in the output buffer memory 36 under control of the control circuit 40, then read out by the cell distributor 38 and distributed to the output processors, again under control of the control circuit 40. In this way the cells are partially demultiplexed. The output processors complete the demultiplexing process by sending cells to the appropriate output ports at the appropriate data rates and data widths.

In FIG. 3, for example, the first and n-th output processors 41 and 43 output cells 11 to 1m and n1 to nm simultaneously, at a data rate of v and data width of b bits per cell, to the output ports in groups one and n. The second output processor meanwhile outputs cells 21 to 2m to the single output port in group two, at a data rate of mv and data width of mb bits.

Although shown as a single module in FIG. 3, the cell demultiplexer 32 can be subdivided into a plurality of modules, as will be explained later.

FIGS. 4 to 7 illustrate the data rate and data width conversion functions of the input, and output processors when m=4 in FIG. 3.

Figure 4:
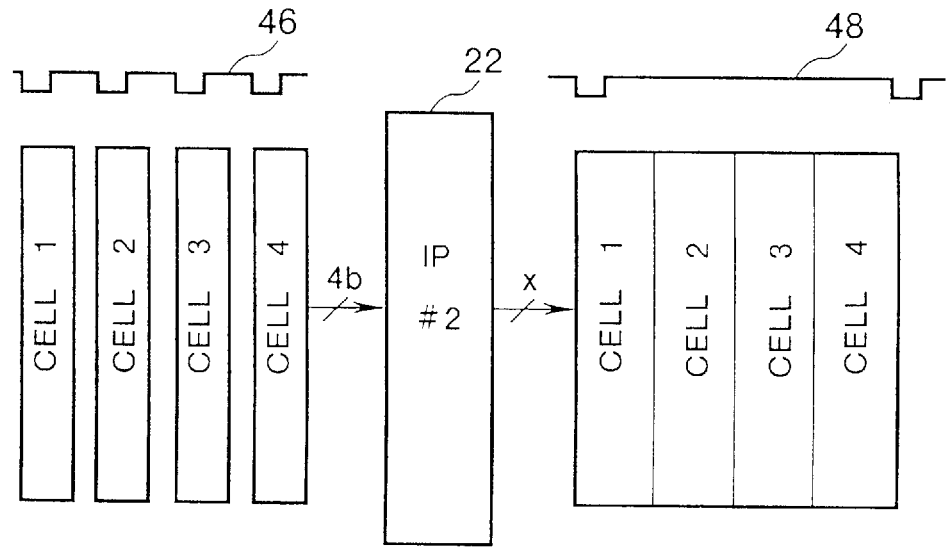
FIG. 4 illustrates data rate conversion for one group of input ports in FIG. 3.

In FIG. 4, the second input processor 22 receives four cells in succession at a data width of 4b bits. The start of each cell is synchronized with the falling transition of a cell clock signal 46. In writing cells into the cell multiplexing memory 25, the second input processor 22 outputs cell data at a data width x, which may be different from 4b, in synchronization with a different timing signal 48.

Figure 5:
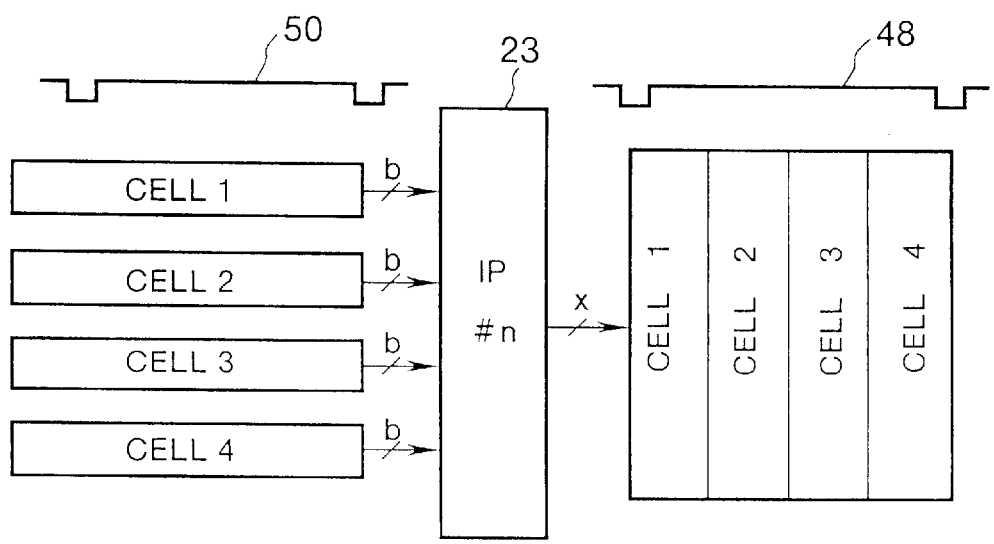
FIG. 5 illustrates data rate conversion for another group of input ports in FIG. 3.

In FIG. 5, the n-th input processor 23 receives four cells in parallel, each at a data width of b bits. These four cells are shown as starting in synchronization With a different cell clock signal 50, although in general the starts of the cells need not be synchronized. The n-th input processor 23 converts these cells to the same bit width x as in FIG. 4, and writes them one after another into the cell multiplexing memory 25, in synchronization with the same timing signal 48. Each cell is written at a higher data rate than the rate at which it was received by the input, processor 23.

Figure 6:
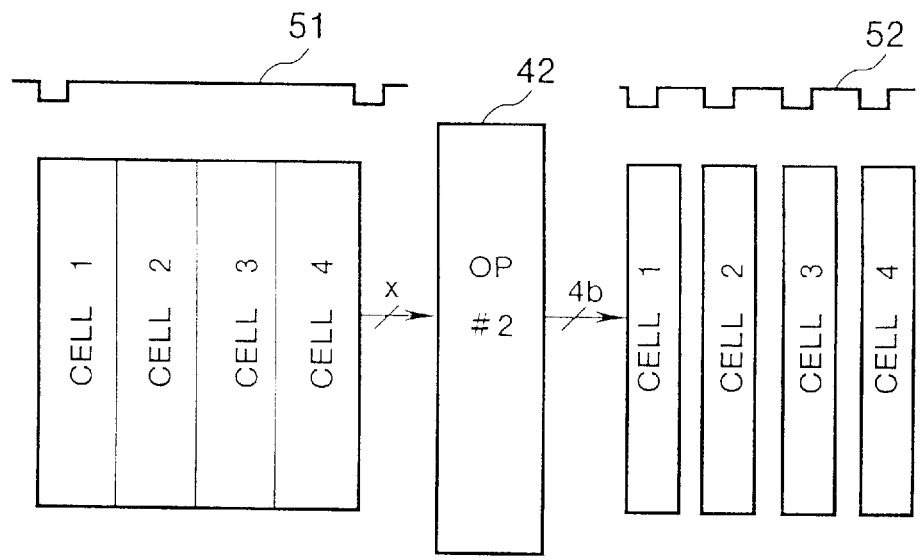
FIG. 6 illustrates data rate conversion for one group of output ports in FIG. 3.

In FIG. 6, the second output processor 42 receives four cells, one after another, from the cell distributor 38 in synchronization with a timing signal 51, at a data width of x bits, and outputs them, one after another, at a data width of 4b) bits in synchronization with a cell clock signal 52.

Figure 7:
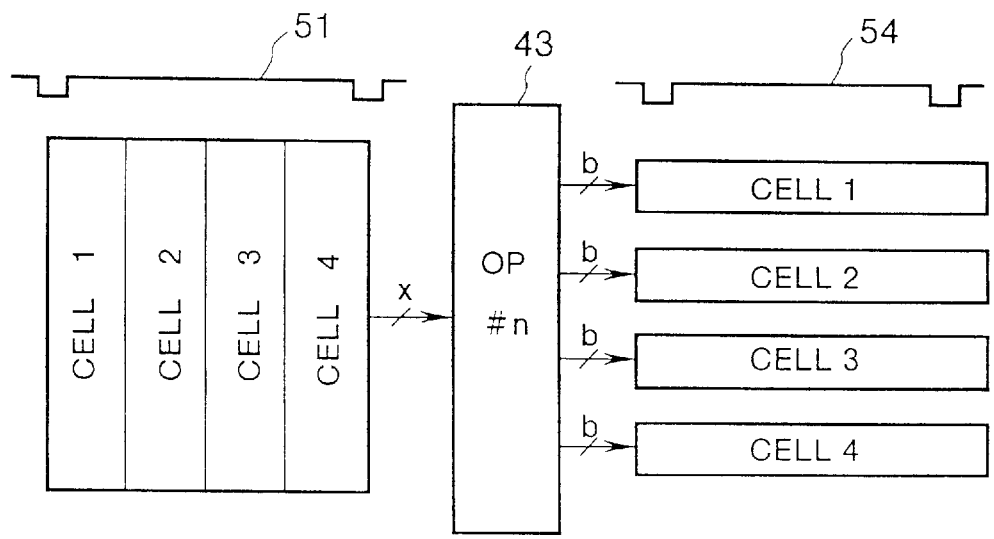
FIG. 7 illustrates data rate conversion for another group of output ports in FIG. 3.

In FIG. 7, the n-th output processor 43 receives four cells as in FIG. 6, but outputs them in parallel to one another, in synchronization with a cell clock signal 54, at a data width of b bits per cell. Each cell is output at a lower data rate than the rate at which it was received by the output processor 43.

The input and output processors in FIGS. 3 to 7 enable the ATM cell switch to be connected to both input and output ports of differing data rates and data widths, without requiring extra hardware to interface between the ATM cell switch and these ports.

Although omitted from FIGS. 3 to 7 to simplify the drawings, additional information 14 is input and output together with the cell data and is processed by the input and output processors in the same way as the cell data.

Figure 8:
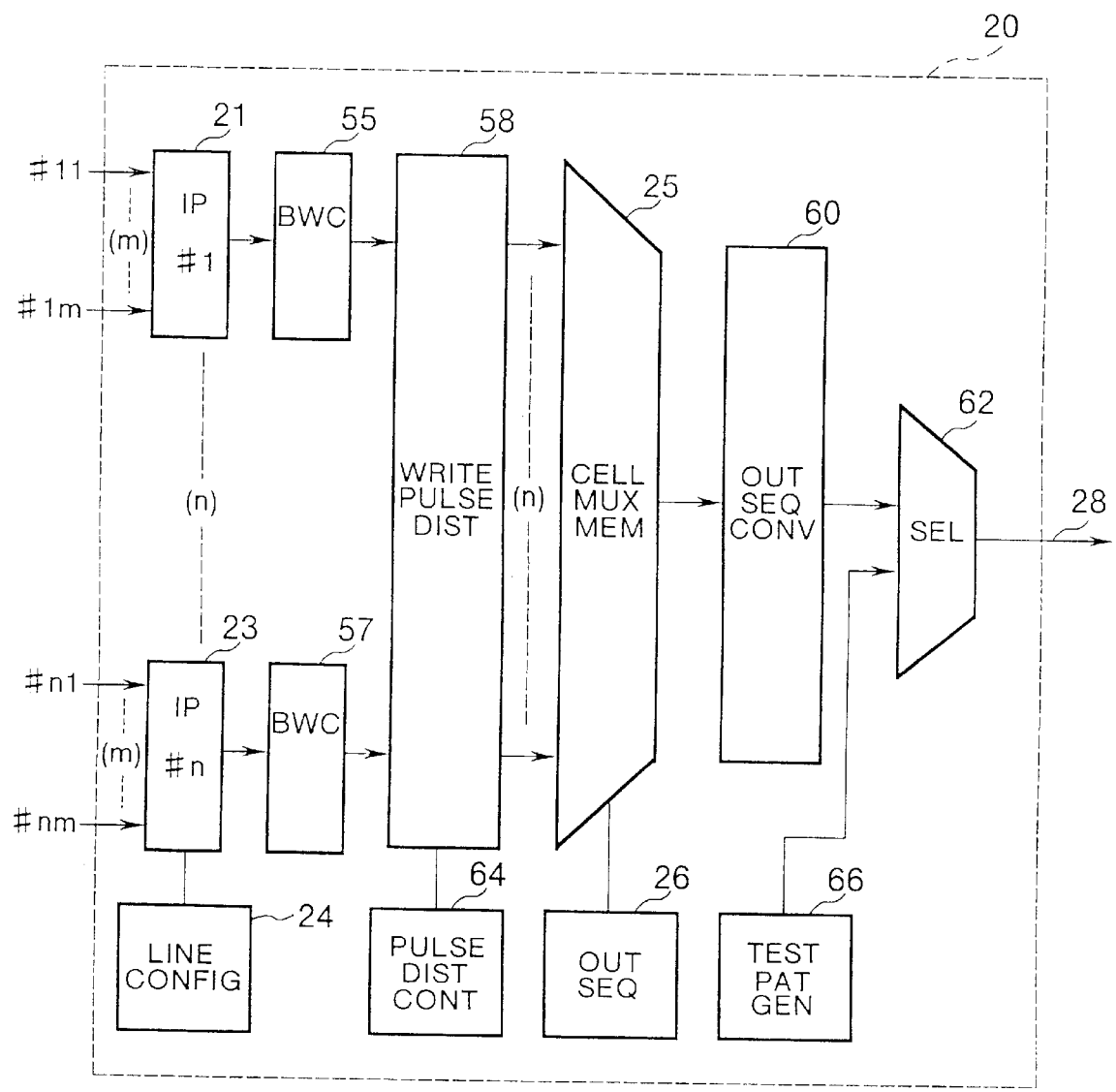
FIG. 8 is a more detailed block diagram of the cell multiplexer in FIG. 3.

FIG. 8 shows the cell multiplexer 20 in more detail. The numbers from #11 to #nm to the left of the cell multiplexer 20 represent input ports in groups one and n. The input processors 21 and 23 and port configuration unit 24 are similar to those in FIG. 3, except that in FIG. 8 it is not necessary for all n input processors to have the same output data width. The cell multiplexing memory 25 and output sequencer 26 are as in FIG. 3. Additional elements that were not shown in FIG. 3 include n bus width converters (BWCs), of which only the first and n-th bus width converters 55 and 57 are visible, and a write pulse distributor 58, an output sequence converter 60, a selector 62, a pulse distribution controller 64, and a test pattern generator 66.

The bus width converters 55 and 57 convert the outputs of the input processors 21 and 23 to a uniform data width, performing a function which was included in the input processors in FIGS. 3 to 7. The function of the input processors in FIG. 8 is now to assure that all bus width converters receive the same amount of data per unit time, properly arranged into cells.

The write pulse distributor 58 generates write pulses that cause cell data (and additional information) to be written from the input processors via the bus width converters into the cell multiplexing memory 25, and distributes these write pulses to different parts of the cell multiplexing memory 25. The pulse distribution controller 64 controls the distribution of these write pulses so as to prevent too many write pulses from occurring at the same time. Details will be given later.

The output sequence converter 60 accepts cell data from the cell multiplexing memory 25 and rearranges the data within each cell. The test pattern generator 66 generates test pattern data. The selector 62 selects either the cell data rearranged by the output sequence converter 60 or the test pattern data output by the test pattern generator 66, and places the selected data on the shared bus 28. Details of these functions will also be given later.

Next the timing of the write pulses will be described with reference to FIGS. 9 and 10.

Figure 9:
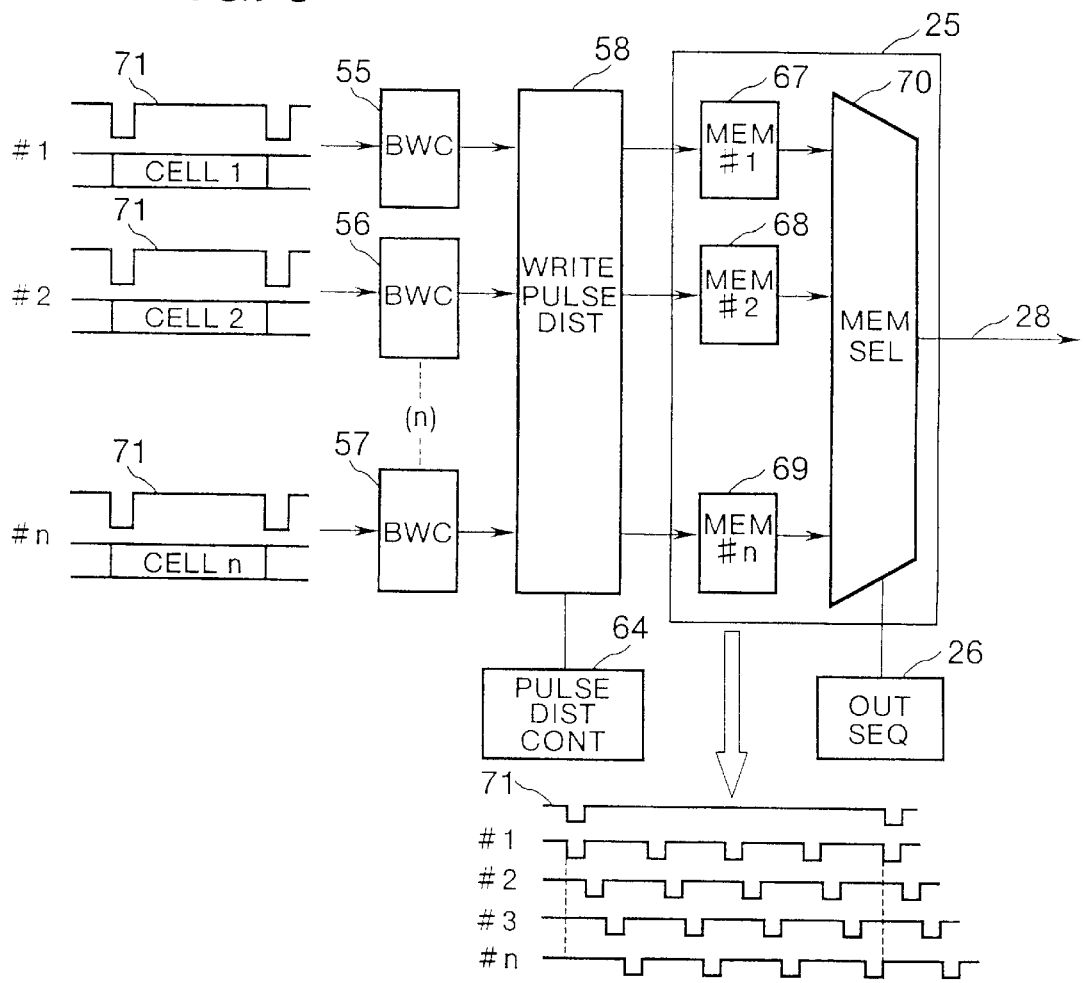
FIG. 9 illustrates the operation of the pulse distribution controller in FIG. 8.

Differing from FIGS. 3 to 8, FIG. 9 shows the case in which there is one input port per group, hence one input processor and one bus width converter per input port. Only the bus width converters are shown in FIG. 9. The following description also applies, however, to the general case of arbitrary groupings of input ports.

FIG. 9 shows the structure of the cell multiplexing memory 25 and illustrates the operation of the pulse distribution controller 64. The cell multiplexing memory 25 comprises n input memories, of which the first, second, and n-th input memories 67, 68, and 69 are shown. Each of these operates as a first-in-first-out (FIFO) memory, storing cell data input, via the corresponding bus width converter 55, 56, or 57 at timings determined by the write pulse distributor 58, and supplying the cell data on demand to a memory selector 70. The memory selector 70 selects the n input memories in turn, in a cyclic sequence determined by the output sequencer 26, and outputs a certain number of cells from the selected memory module to the shared bus 28, via the circuits shown in FIG. 8.

The write pulses originate in the bus width converters 55, 56, and 57; when a bus width converter has data ready to write, it sends a pulse to the write pulse distributor 58. The pulse distribution controller 64 then reschedules these write pulses so that no more than M write pulses will occur at the same time, and the write pulse distributor 58 passes the rescheduled write pulses on to the input memories 67, 68, and 69. M is a positive integer less than the number of input memories, i.e. less than n.

FIG. 9 shows cell input from all ports occurring in synchronization with a timing signal 71, so that the bus width converters generate write pulses for all input ports simultaneously. As indicated by the timing waveforms at the bottom of FIG. 9, however, the pulse distribution on controller 64 staggers the write pulses so that they occur at different times. Write activity in the n input memories is therefore spread out evenly over time, instead of all occurring at the same time. The input memories accordingly draw current at a substantially even rate.

The absence of large fluctuations in current consumption means that the voltages supplied to the cell multiplexer 20 will remain substantially constant without the need for a strongly regulated power source. Electrical noise on signal lines is also reduced. Staggering the write pulses provides an efficient way to increase the reliability of the ATM cell switch, without requiring a large, expensive power supply circuit.

Figure 10:
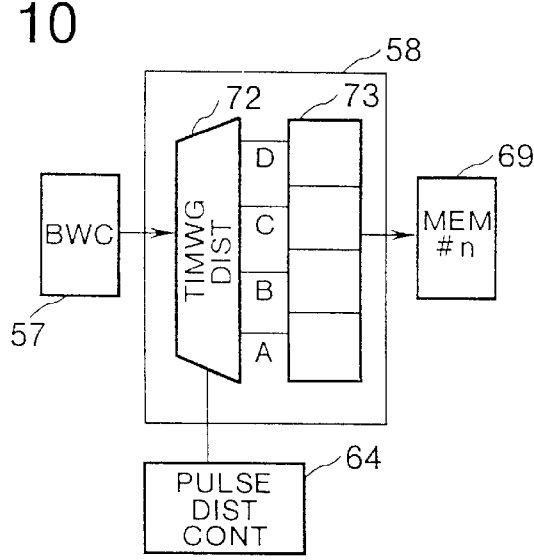
FIG. 10 illustrates the structure of the write pulse distributor in FIG. 8.

FIG. 10 shows one possible structure of the write pulse distributor 58. This write pulse distributor 58 has a plurality of timing distributors 72, which are coupled to corresponding bus width converters, and a plurality of shift registers 73, which are coupled to corresponding input memories. FIG. 10 shows only the timing distributor 72 and shift register 73 connected to the n-th bus width converter 57 and n-th input memory 69. The write pulse distributor 58 requires at least n–M such pairs of timing distributors 72 and shift registers 73, and may have as many as n pairs. The shift registers 73 may have an arbitrary number of stages; the shift, register 73 in FIG. 10 has four stages, indicated by the letters A to D. The shift direction is from A to D.

The timing distributor 72 distributes a write pulse received from the bus width converter 57 to one of the four stages A to D of the shift register 73. The stage is selected by the pulse distribution controller 64 according to the write pulses already scheduled for other input memories, so as not to occur at the same time as any M other write pulses. One possible scheduling rule is for the pulse distribution controller 64 to select the earliest stage that satisfies this condition, selecting stage D with the highest preference and stage A with the lowest preference.

If, for example, the write pulses are active low, and if the pulse distribution controller 64 selects stage B, then the timing distributor 72 will write a "zero" bit into stage B of the shift registers 73, and "one" bits into the other stages. The pulse written in this way is shifted from stage B to stage C, then to stage D, then out from stage D to the input memory 69, at which point input memory 69 stores the data held in the bus width converter 57. The shift register 73 is thus a means of delaying the write pulse by a programmable amount.

If M=1, the timing distributor 72 and shift register 73 for one input memory, e.g. the first input memory, can be omitted. Write pulses for this input memory will never conflict with each other, so they can be scheduled whenever they occur. Write pulses for other input memories can be delayed to avoid conflict with write pulses for the first input memory, and with each other.

Similarly, if M=2, the timing distributors 72 and shift registers 73 for the first and second input memories can be omitted, and the write pulses for other input memories can be delayed to avoid conflict with more than one other write pulse. In the general case, the timing distributors 72 and shift registers 73 for M input memories can be omitted, although this is not necessarily desirable.

Next the operation of the output sequencer 26 in FIGS. 8 and 9 will be described. FIGS. 11 to 15 illustrate the simplest case, in which each input port group consists of just one input port, so that there are n input ports and n input memories, as in FIG. 9. FIGS. 16 to 19 deal with the more general case of an arbitrary grouping of input ports.

Figure 11:
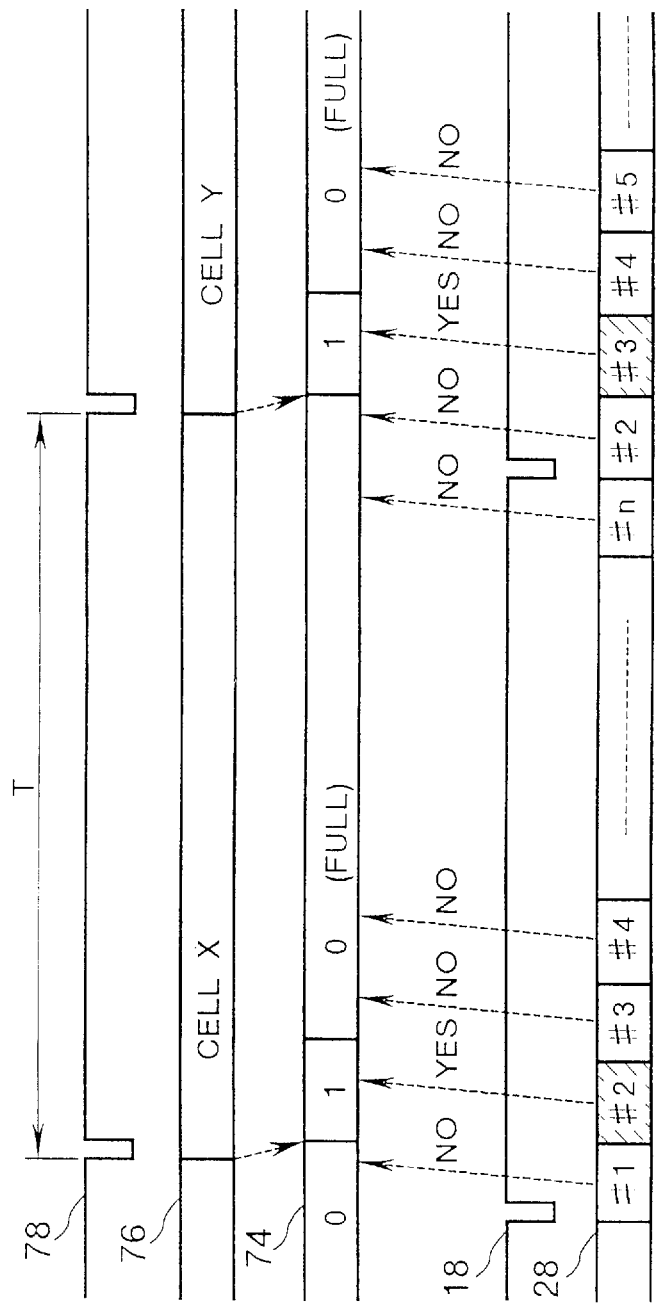
FIG. 11 illustrates an example of a preferred cell multiplexing sequence.

As stated earlier, the output sequencer 26 causes the memory selector 70 in FIG. 9 to select the input memories in a cyclic sequence and output a certain number of cells from each onto the shared bus 28. In FIG. 11 this certain number is one: in the first frame defined by the frame synchronization signal 18, the memory selector 70 selects first a cell #1 from the first input memory, then a cell #2 from the second input, memory, and so on through cell #n from the n-th input memory, placing these cells on the shared bus 28 in the sequence shown. These cells come from input ports #1, #2, . . . , #n, respectively.

The output sequencer 26 is adapted, however, to alter the cyclic sequence periodically, so in the next frame the output sequencer 26 starts with a cell (again indicated as #2) from the second input memory, then proceeds with cells #3 to #n from the third to n-th input memories, and returns to take at cell from the first input memory at the end of the frame (not, shown). In the following frame, the cycle starts with a cell from the third input, memory, wraps around from the n-th input memory to the first input memory, and ends with a cell from the second input memory. In further frames the cyclic sequence is altered in the same way, slipping forward by one cell per frame.

FIG. 11 also illustrates the status 74 of the output buffer of one of the output ports, e.g. the first output port #1, and the cells 76 output from that buffer in synchronization with an output timing signal 78.

Buffer status is shown by indicating the number of empty spaces in the buffer. At the left of FIG. 11 the buffer has become full due to congestion of cell traffic at output port #1, and has zero empty spaces. Accordingly, when cell #1 from the first input memory is placed on the shared bus 28, even if this cell is addressed to output port #1, it cannot be written into the output buffer, as indicated by the dashed arrow marked NO. Output port ##1 is blocked and the cell must be dropped.

The occurrence of an output timing pulse 78, however, now causes a cell (cell X) to be output from the output buffer to output port #1, creating one empty space and( unblocking the buffer of output port #1. Accordingly, when cell #2 from the second input memory is placed on the shared bus 28, if addressed to output port #1, it will be written into the output buffer, as indicated by the arrow marked YES.

The buffer is now full again, so cells #3 to #n -from the other input memories are blocked from output port #1.

The same type of blocking occurs if the next frame of cells on the shared bus 28, but this time the frame starts with a cell #2 from the second input memory. The buffer is still full, so this cell is blocked. Next, output of cell Y creates one empty space in the output buffer, enabling a new cell #3 from the third input memory to be written. After that, cells from other input memories (cells #4 to #n and #1) will be blocked.

Due to the alteration of the multiplexing sequence on the shared bus 28, over the long run cells from all input, memories have an equal chance to be written into the congested output buffer. This arrangement helps the ATM cell switch maintain an equally low cell loss rate for all input ports, instead of a lower rate for some input ports and a higher rate for others.

Figure 12:
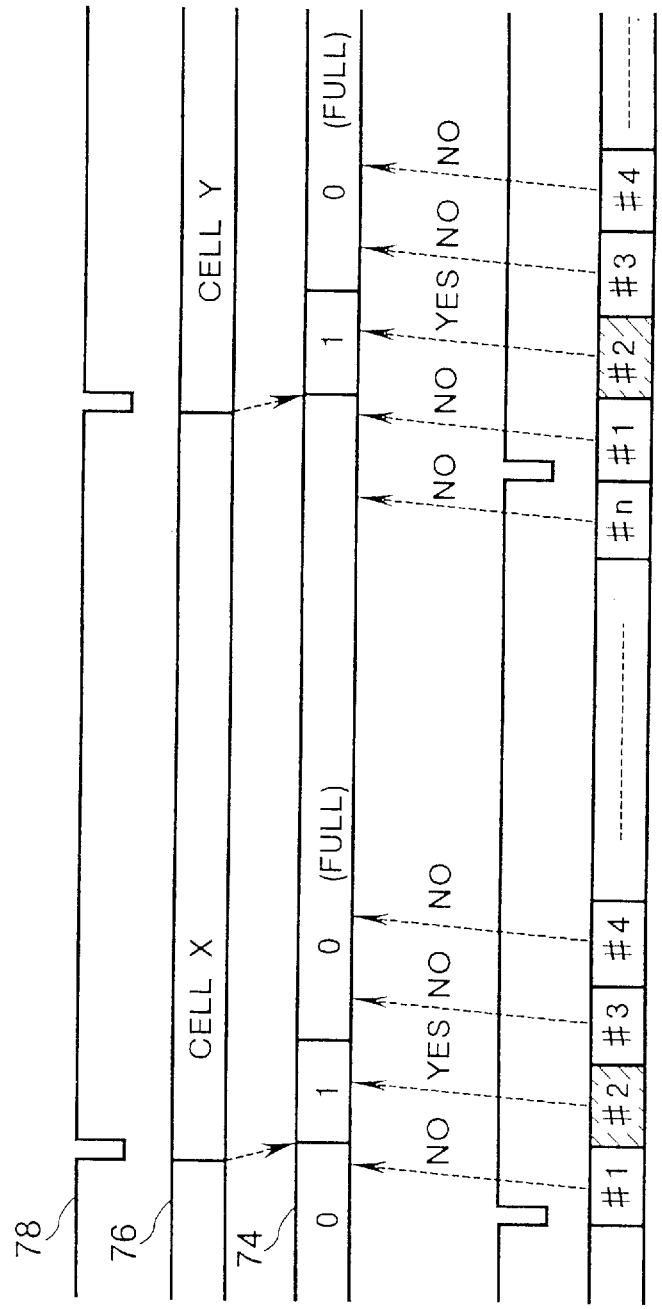
FIG. 12 illustrates a conventional cell multiplexing sequence.

For comparison, FIG. 12 shows the operation of a conventional ATM cell switch that does not periodically alter the multiplexing sequence. The same reference numerals are used as in FIG. 11. Due to the fixed multiplexing sequence, cell #2 from input port #2 always gets the first chance to be written into the empty space in the output buffer of output port #1. When input port #1 competes with other input ports for access to output port #1, input port #1 always loses, leading to an undesirably high cell loss rate at this input port.

Figure 13:
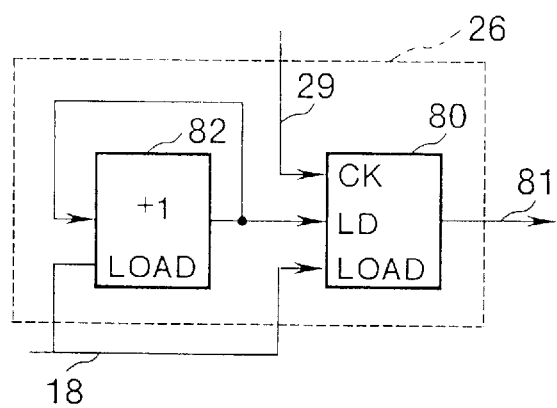
FIG. 13 illustrates one preferred structure of the output sequencer in FIG. 8.

FIG. 13 shows one preferred structure of the output sequencer 26, which produces the multiplexing sequence in FIG. 11. The output sequencer 26 comprises a read address counter 80 which outputs a count signal 81 that cycles among n values, selecting the n input memories in turn, thereby producing the cell multiplexing sequence. The output count 81 is generated by counting the cell clock signal 29, which is input at a clock terminal CK of the read address counter 80. The count 81 is initialized to a value input at a terminal marked LD when the read address counter 80 receives a frame synchronization pulse 18 at a terminal marked LOAD.

The LD input is obtained from an incrementer 82, and is also fed back as an input value to the incrementer 82. In response to a frame synchronization pulse 18 input at its load terminal, the incrementer 82 latches and increments the input LD value, so that at the next frame synchronization pulse 18, the LD value will be increased by one. This arrangement causes the multiplexing sequence to slip forward by one count (one cell) per frame.

Figure 14:
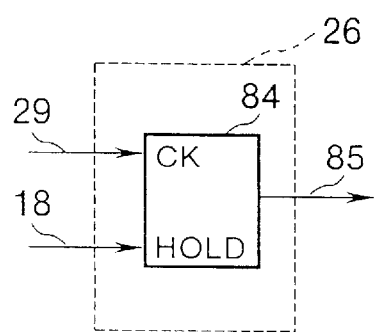
FIG. 14 illustrates another preferred structure of the output sequencer.

FIG. 14 shows another preferred structure of the output, sequencer 26, comprising a read address counter 84 that receives the cell clock signal 29 and frame synchronization signal 18. By counting the cell clock signal 29, the read address counter 84 generates an output count signal 85 that cycles among n values, like the output count signal 81 in FIG. 13. When a frame synchronization pulse is received (at a terminal marked HOLD), however, the read address counter 84 ignores one clock cycle, so that the same output count is repeated.

Figure 15:
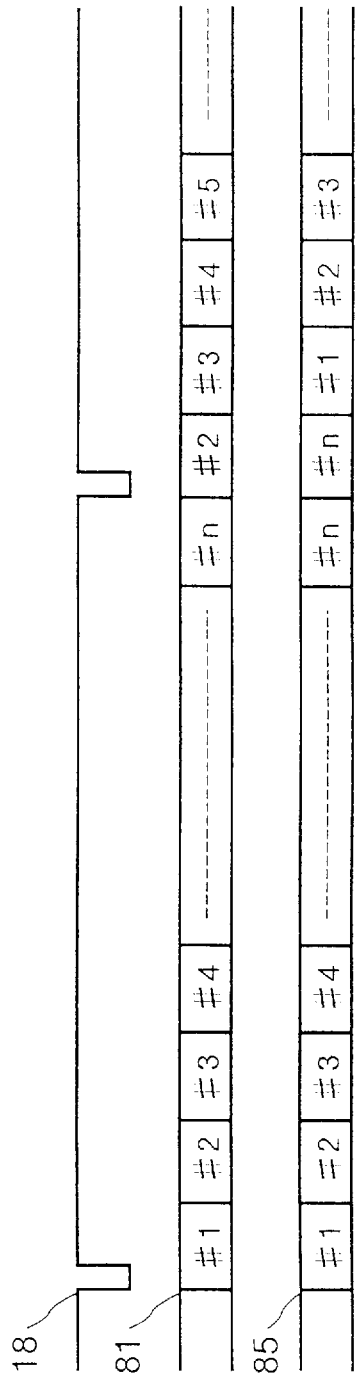
FIG. 15 illustrates cell multiplexing sequences resulting from the structures in FIGS. 13 and 14.

FIG. 15 compares the operation of FIGS. 13 and 14. The output signal 81 in FIG. 13 selects input ports (input memories) in the sequence #1, #2, . . . , #n in one frame, then in the sequence #2, . . . , #n, #1 in the next, frame, and continues in this way, adjusting the multiplexing sequence forward by one port (one cell ) in each frame. The output signal 85 in FIG. 14 selects input ports in the sequence #1, #2, . . . , #n in one frame, then in the sequence #n, #1, #2, . . . in the next frame, and continues in this way, adjusting the multiplexing sequence backward by one port (one cell) per frame. Both of these schemes tend to distribute cell loss equitably among the input ports.

Figure 16:
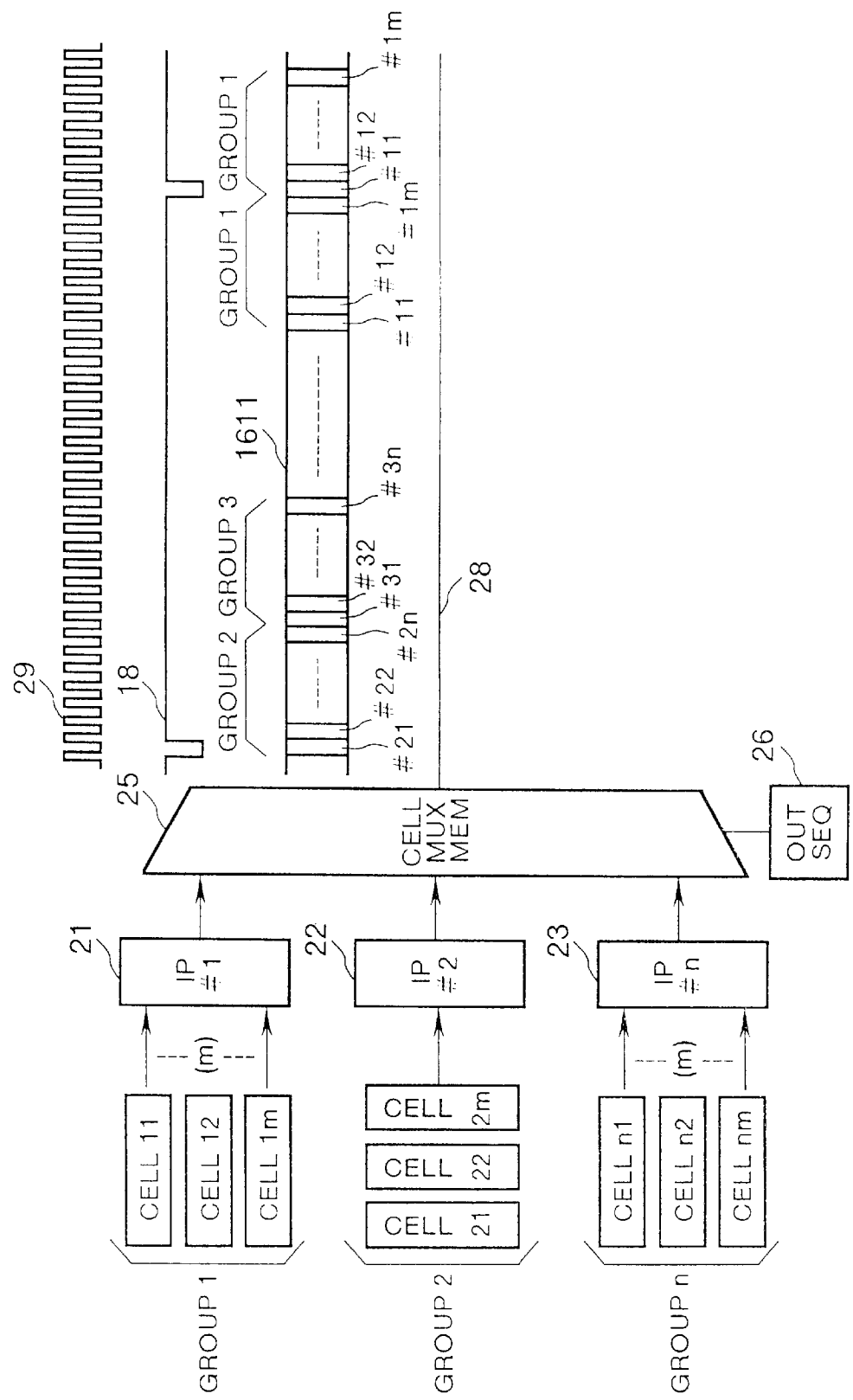
FIG. 16 illustrates another example of a preferred cell multiplexing sequence.

FIG. 16 illustrates the case in which the input ports are grouped in the same way as in FIG. 3, with m input ports in group one, one input port in group two, and m input ports in group n. Input, processors 21, 22, and 23 write cells from these three groups into the cell multiplexing memory 25. When the multiplexing sequence is altered, it is important not to alter the sequence of cells from any one input port. In particular, the sequence of cells 21, 22, . . . , $2m$ from the input port in group two must not be altered.

The output sequencer 26 accordingly alters the multiplexing sequence in units of groups of input, ports, rather than in units of individual cells. In the example shown, in one frame the output sequencer 26 selects group two, then group three, . . . , group n, group one. In the next frame it starts by selecting group one again, then proceeds from group two to group n.

Figure 17:
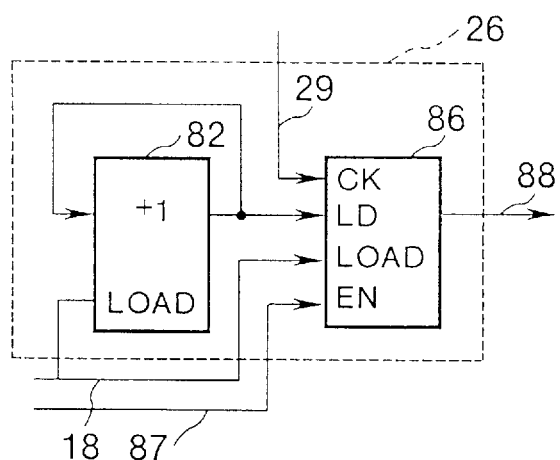
FIG. 17 illustrates another preferred structure of the output sequencer.

FIG. 17 shows one preferred structure of the output sequencer 26 for the ease of grouped input ports. The incrementer 82 is identical to the incrementer 82 in FIG. 13. The read address counter 86 is similar to the read address counter 80 in FIG. 13, except that it receives an additional enable signal (EN) 87, which enables and disables the counting operation. This enable signal 87 becomes active only once every m cycles of the cell clock signal 29, slowing the output count 88 so that it increments only once every m cells. Accordingly, m cells will be multiplexed from each group (from each input memory) before the multiplexing sequence proceeds to the next group.

Figure 18:
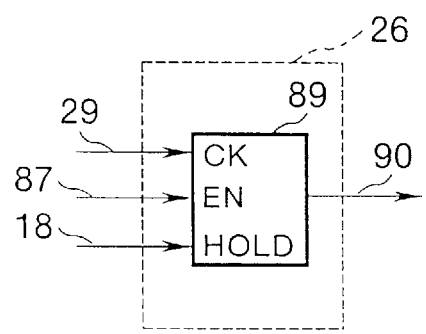
FIG. 18 illustrates yet another preferred structure of the output sequencer.

FIG. 18 shows another preferred structure of the Output sequencer 26. The read address counter 89 operates like the read address counter 84 in FIG. 14, except that it, receives the same enable signal 87 as in FIG. 17, causing the output count signal 90 to increment only once per m cells. This produces the multiplexing sequence that was shown in FIG. 16.

Figure 19:
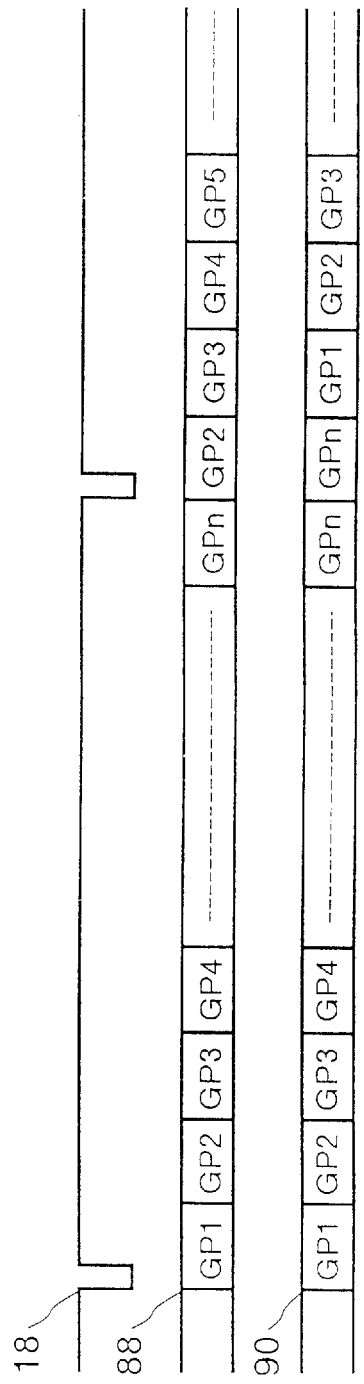
FIG. 19 illustrates cell multiplexing sequences resulting from the structures in FIGS. 17 and 18.

FIG. 19 compares the output count signals 88 and 90 in FIGS. 17 and 18. Output, signal 88 selects groups of input ports in sequence from group one (GP1) to group n (GPn) in one frame, then starts with group two (GP2) in the next frame, m cells being multiplexed from each group when selected. The multiplexing sequence is therefore adjusted forward by one group per frame. Output signal 90, after selecting groups one to n in order in one frame, starts with group n in the next frame, adjusting the multiplexing backward by one group per frame. These schemes do not distribute cell loss quite as evenly as the schemes in FIG. 16, because they do not alter the multiplexing sequence within each group, but they still provide sufficient balance to ensure that, no one input port is severely discriminated against.

It remains to describe the demultiplexer and bus structure and the functions of the output sequence converter 60, selector 62, and test pattern generator 66 in more detail.

Figure 20:
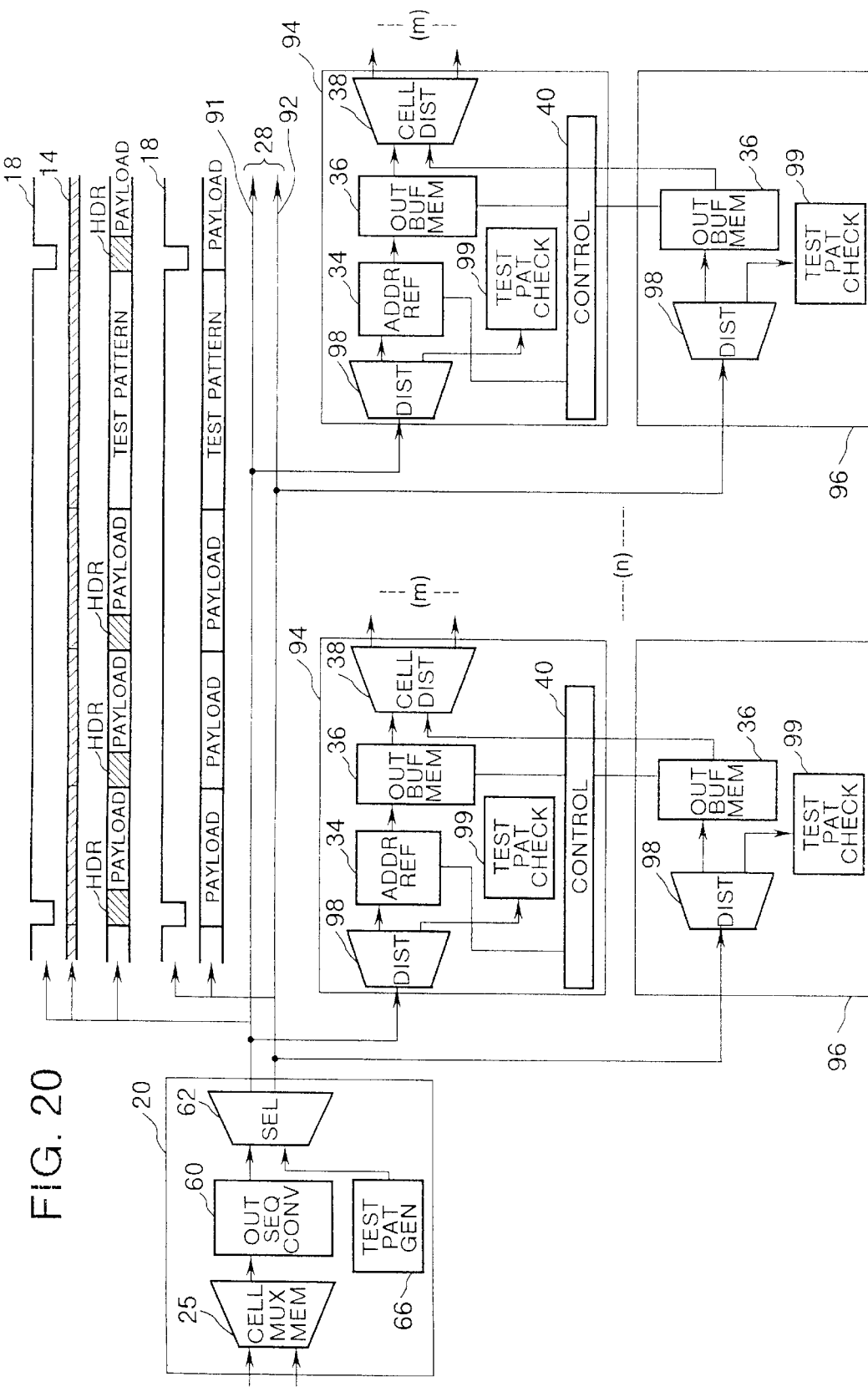
FIG. 20 illustrates the structure and bus interconnections of master and slave demultiplexers.

FIG. 20 shows an embodiment in which the shared bus 28 is divided into two parallel parts 91 and 92. The output ports are divided into n groups as in FIG. 3, and the demultiplexer is divided into separate modules, comprising one master demultiplexer module 94 and one slave demultiplexer module 96 for each group of output ports. The master demultiplexer modules 94 are coupled to the first part 91 of the shared bus 28; the slave demultiplexer module 96 are coupled to the second part 92. FIG. 20 shows only the master and slave demultiplexer modules 94 and 96 of output groups one and n, both of which are connected to m output ports.

In the cell multiplexer 20, the output sequence converter 60 rearranges the cell data so that the five-byte header (HDR) and the additional information 14 are placed entirely on the first part 91 of the shared bus 28. The forty-eight bytes of payload data in each cell are distributed over both the first and second parts 91 and 92 of the shared bus 28. For synchronization purposes, the frame synchronization signal 18 is supplied to both parts 91 and 92 of the shared bus 28.

The test pattern generator 66 generates test pattern data for both parts of the shared bus 28. The test pattern can be, for example, a pseudo-random pattern created by use of a generator polynomial such as the well-known polynomial $X^{23}+X^8+X+1$. Alternatively, the test pattern can be a simple fixed pattern, such as a pattern of alternating "zero" and "one" bits on each bit line of the shared bus 28. The test pattern should provide both zero-to-one and one-to-zero transitions on each line.

The selector 62 selects the outputs of the output sequencer converter 60 and test pattern generator 66 so that each frame on the shared bus 28 begins with cell data from all groups of input ports, and ends with test pattern data. This arrangement can of course be varied; each frame can start with test pattern data, or test pattern data can be inserted in place of dummy cells (cells added for data rate alignment, not addressed to any output port). In general, test pattern data can be placed in any time slots on the bus which are not assigned to valid cell data. If such free time slots do not occur naturally in the cellstream, they can be created by raising the data rate on the shared bus 28. Although not explicitly indicated in FIG. 20, test pattern data can also be placed on the bus lines carrying additional information 14 during these time slots.

The master demultiplexer modules 94 are similar in structure to the cell demultiplexer 32 in FIG. 3, comprising an address reference unit 34, output buffer memory 36, and cell distributor 38, but since there is already a separate master demultiplexer module 94 for each group of output ports, the functions of the port configuration unit 44 in FIG. 3 are simplified and have been subsumed into the control circuits 40 in FIG. 20. The output processors that were shown in FIG. 3 have been omitted from FIG. 20 in order to simplify the drawing. Conversely, FIG. 20 shows a distributing circuit 98 and test pattern checker 99, which were omitted in FIG. 3. The distributing circuit 98 distributes cell data to the address reference unit 34, and test pattern data to the test pattern checker 99.

Each slave demultiplexer module 96 has an output buffer memory 36, a distributing circuit 98, and a test pattern checker 99, which are similar to the corresponding parts in the paired master demultiplexer module 94. The output buffer memory 36 in the slave demultiplexer module 96 is controlled by the control circuit 40 in the master demultiplexer module 94, and outputs data to the cell distributor 38 in the master demultiplexer module 94.

Each master demultiplexer module 94 and each slave demultiplexer module 96 is preferably implemented as a separate integrated circuit (IC), but if this is not possible, the output buffer memory 36 can be separate.

Figure 21:
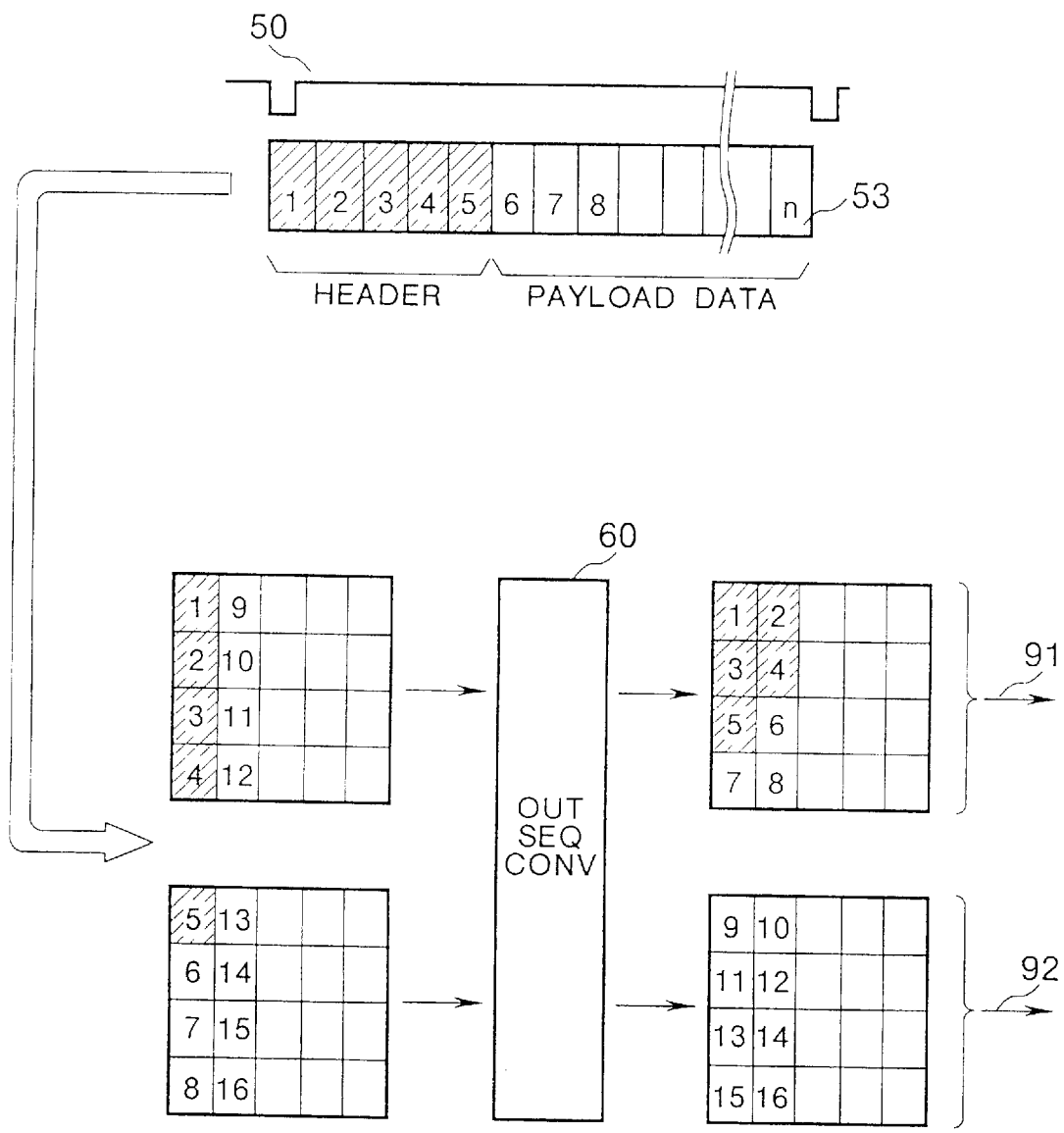
FIG. 21 illustrates the operation of the output sequence converter in FIG. 20.

FIG. 21 illustrates the rearrangement process performed by the output sequence converter 60 for the case in which the data width of the cell data is thirty-two bits on each part 91 and 92 of the shared bus 28. Shown at the top of FIG. 21 are the fifty-three bytes of a cell as received by the cell multiplexer 20 in synchronization with a cell clock signal 50. The first five bytes (shaded) are the header; the remaining forty-eight bytes are the payload data. This cell is output from the cell multiplexing memory 25 in the received sequence of bytes. Without conversion of the output sequence, the first four bytes would be placed on the first part 91 of the shared bus 28 and the next four bytes on the second part 92, splitting the header up between the two parts of the shared bus 28.

To avoid this, the output sequence converter 60 rearranges the output sequence so that eight. odd-numbered bytes are output, followed by eight even-numbered bytes. This arrangement places all five header bytes on the first part 91 of the shared bus 28, so that they can be passed to the control circuits 40 in the master demultiplexer modules 94 in FIG. 20.

Next, the operation of the master and slave demultiplexer modules 94 and 96 in checking the test pattern data will be described. In FIG. 20, the distributing circuits 98 recognize the position of the test patterns on the shared bus 28 by their relationship to the frame synchronization signal 18, and direct the test pattern data to the test pattern checkers 99. If the test pattern data were produced from a generator polynomial, the test pattern checkers 99 check the received test pattern data by using the same generator polynomial. If fixed test pattern data are used, the test pattern checkers 99 compare the received test pattern data with the fixed pattern.

The test pattern checkers 99 check the test pattern data in every master demultiplexer module 94 and every slave demultiplexer module 96, and do so in every frame. Should a faulty connection occur at any point on the shared bus 28, it will be speedily detected and can be precisely located. The test pattern checkers 99 greatly facilitate the diagnosis of hardware faults in the field, and can also speed up pre-shipment tests at the factory.

Next, the demultiplexing operation itself will be described.

When the address reference unit 34 in a particular master demultiplexer module 94 reads the header information in a cell, if the header indicates that the cell is to be routed to an output port in the group of output ports connected to that master demultiplexer module 94, the control circuit 40 sends write commands to the output buffer memories 36 in the master demultiplexer module 94 and paired slave demultiplexer module 96, so that the cell data (and additional information 14) are stored in these output buffer memories 36. If the cell is not addressed to an output port in this group, the control circuit 40 takes no action and the cell is not stored.

Each output buffer 36 is a first-in-first-out memory, so even while data are being written, previously stored data can be read out to the cell distributor 38. The control circuit 40 controls the data read-out so as to supply each output port in the group with data at the appropriate data rate.

The cell distributor 38 receives the cell data from the output buffer memories 36 in the master demultiplexer module 94 and slave demultiplexer module 96 and reassembles the data into complete cells, in the process undoing the rearrangement performed by the output sequence converter 60 in the cell multiplexer 20. The complete cells are then distributed to the appropriate output ports.

By dividing the shared bus 28 into two parts, the embodiment in FIG. 20 reduces the number of I/0 terminals necessary in each demultiplexer module . This advantage is particularly important when the output buffer memories 36 are external to the master and slave demultiplexer modules 94 and 96, and many of the I/O terminals must be used for interfacing with the output buffer memories 36. Reduction of the number of I/0 terminals used for bus interconnections leaves more I/0 terminals available for interconnecting to buffer memory, so that data can be transferred between the demultiplexer modules and their output buffers over wider data paths, hence at higher speed.

If necessary, the shared bus 28 can be divided into more than two parts, and additional slave demultiplexer modules 93 can be provided, further reducing the I/0 count of each IC. This provides added flexibility in the design of the ATM cell switch, enabling the shared bus 28 to be made very wide, so that a high data rate can be achieved with a comparatively low clock rate. The number of I/0 terminals per IC is not a constraining factor on the bus width or other aspects of the design of the invented cell switch.

By enabling all header data and additional information to be received in the master demultiplexer module 94, the embodiment in FIG. 20 lets the control circuit 40 control the demultiplexing operations without requiring complex coordination of control functions between different ICs. Each control circuit 40 can operate independently, which also provides enhanced design flexibility.

Since the slave demultiplexer modules 96 are controlled by the master demultiplexer modules 94, the slave demultiplexer modules 96 can have a simple circuit configuration. This is a particular advantage when the number of slave demultiplexer modules 96 per output port group is two or more.

Figure 22:
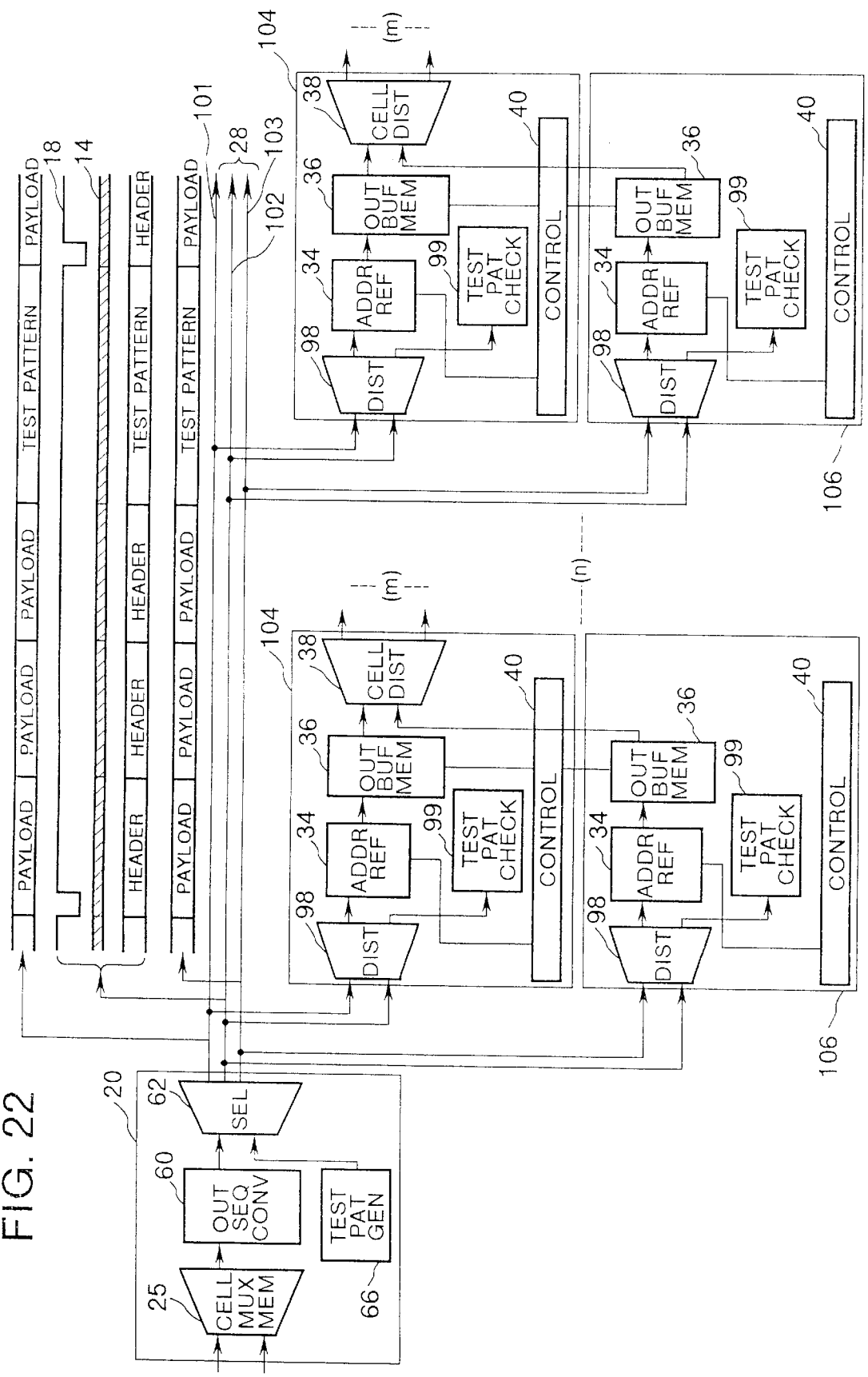
FIG. 22 illustrates an alternative structure of the master and slave demultiplexers.

FIG. 22 shows a slightly different embodiment, in which the shared bus 28 is divided into three parts 101, 102, and 103. The first part 101 carries cell payload data and test pattern data. The second part 102 carries cell header data additional information 14, and the frame synchronization signal 18. The third part 103 carries more cell payload data and test pattern data. The output sequence converter 60 in the cell multiplexer 20 is adapted to place the appropriate data on each part of the shared bus 28, the payload data of each cell being divided between the first and third parts 101 and 103.

For each output port group there is one master demultiplexer module 104 and one slave demultiplexer module 106. These are similar to the master and slave demultiplexer modules 94 and 96 in FIG. 20, except that each slave demultiplexer module 106 has its own address reference unit 34 and control circuit 40, and is not controlled by the control circuit 40 in the master demultiplexer module 104.

The frame synchronization signal 18, additional information 14, and header data on the second part 102 of the shared bus 28 are sent to both the master and slave demultiplexer modules 104 and 106. Each master demultiplexer module 104 and each slave demultiplexer module 106 reads the header information in every cell and stores the appropriate cell data in its output buffer memory 36. The cell data stored in the output buffer memory 36 in the slave demultiplexer module 106 are returned to the cell distributor 38 in the master demultiplexer module 104 for reassembly of complete cells and output of all cell data to the output ports. The cell distributor 38 can match cell data received from the output buffer memory 36 in the slave demultiplexer module 106 with cell data received from the output buffer memory 36 in the master demultiplexer module 104 by matching header information, which is received from both output buffer memories 36.

Although requiring more complex slave demultiplexer modules 106 than the embodiment in FIG. 20, the embodiment in FIG. 22 has the advantage that the master demultiplexer modules 104 do not have to control the slave demultiplexer modules 106. This reduces the number of interconnections necessary between the master and salve demultiplexer modules 104 and 106.

Figure 23:
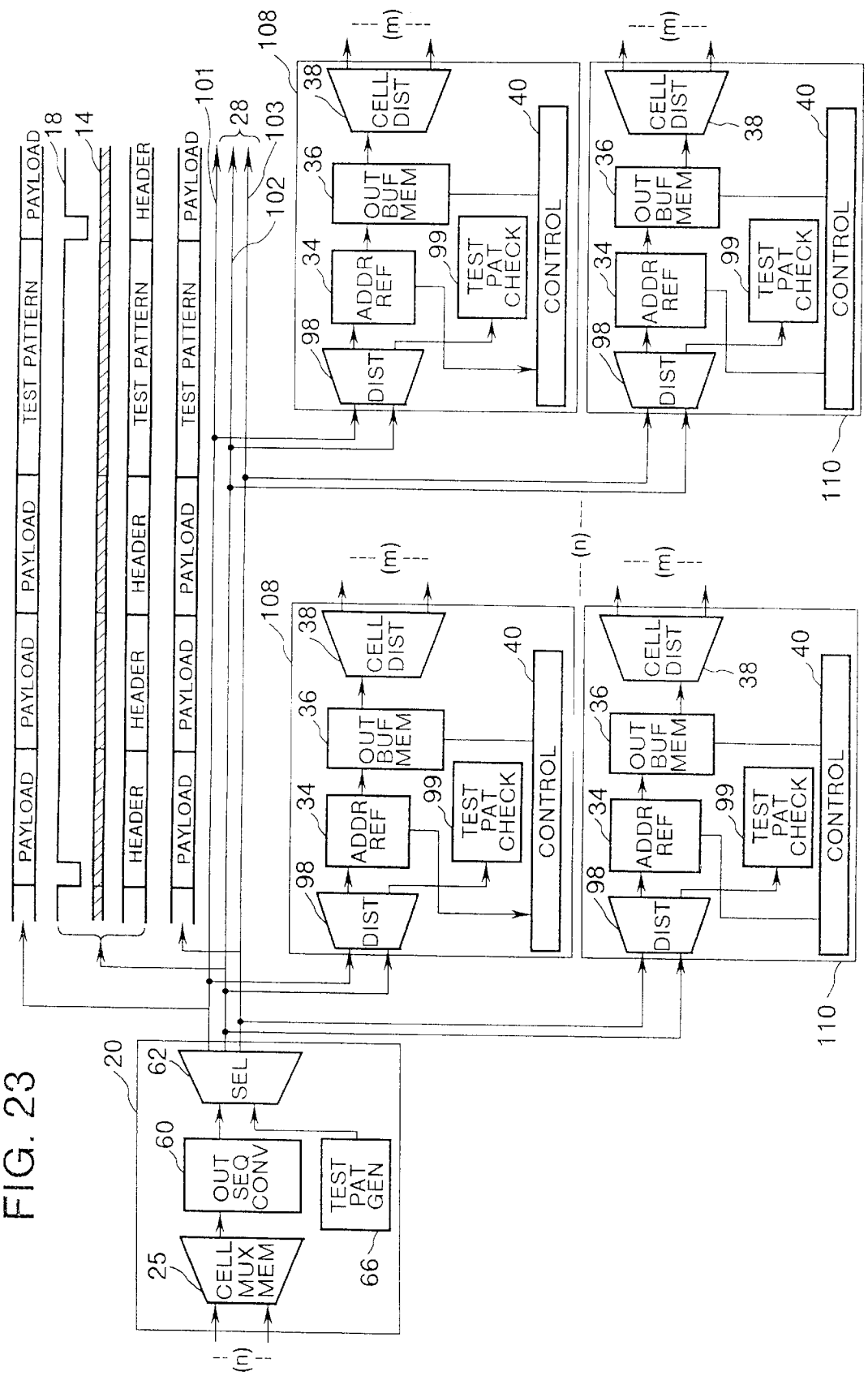
FIG. 23 illustrates another alternative structure of the master and slave demultiplexers.

FIG. 23 shows another embodiment in which, as in FIG. 22, header information is provided to both master and slave demultiplexer modules 108 and 110. The slave demultiplexer modules 110 now have their own cell distributors 38, and output their own cell data from their output buffer memories 36 to the output ports. Each output port accordingly receives cell data from both a master demultiplexer module 108 and a slave demultiplexer module 110. The output sequence converter 60 divides the cell payload data among the first and third parts 101 and 103 of the shared bus 28 in such a way that the cells can be easily reassembled at the output ports. For example, even-numbered bytes can be placed on the first part 101 and odd-numbered bytes on the third part 103.

This embodiment has the advantage of requiring no interconnections between the master and slave demultiplexer modules 108 and 110. Cell data received at output ports from a master demultiplexer module 108 and slave demultiplexer module 110( can be matched up by comparing header information. The master and slave demultiplexer modules 108 and 110 can be identical, which is an advantage from the standpoints of design and manufacturing efficiency.

The present invention is not restricted to the embodiments illustrated in the drawings, but includes further modifications and variations, some of which are as follows.

To say that the additional information 14 is not inserted in the cellstream means that at no point are extra time slots inserted between cells for the purpose of transmitting additional information. Extra space existing naturally within the cellstream, however, may be used.

Since the cell length is fifty-three bytes, there will often be extra space available on the shared bus 28 inside the ATM cell switch. If the bus width is sixty-four bits (eight bytes), for example, as in FIG. 21, each cell will occupy seven bus cycles, but one of these cycles will have only forty bits (five bytes) of cell data. Three bytes of additional information 14 can be placed in the remaining twenty-four bits (three bytes) of this bus cycle.

When the cell is transmitted from its input port to the ATM cell switch, however, if the data width is only eight bits at this point, the three bytes of additional information are transmitted in parallel on a separate signal line. If there are only three bytes of additional information, a single one-bit signal line will suffice.

Although FIGS. 20, 22, and 23 portrayed each demultiplexer module as having its own output buffer memory, the invention can also be practiced with a common output buffer shared by all the demultiplexer modules. The advantages of having separate master and slave modules remain unchanged. Various types of memory devices can be used for output buffering, including dynamic random-access memory (RAM), static RAM, FIFO memory, shift registers, or a combination of these.

The invention can be practiced with bus division schemes other than those shown in FIGS. 20, 22, and 23. In FIG. 20, for example, instead of rearranging the cell data so that, all header information is placed on the first part 91 of the shared bus 28, header information can be allowed to appear on some of the bus lines in the second part 92, and the master demultiplexer modules 94 can be coupled to those bus lines in the second part 92. Viewed differently, this means that the first and second parts of the shared bus 28 can overlap. Conversely, it is not necessary to provide the master demultiplexer modules with header information that is not needed for selecting an output port. Error control information is an example of such information, which need not be placed on the first part 91 of the shared bus 28 in FIG. 20, or on the second part 102 in FIGS. 22 and 23.

If the additional information 14 includes address information which can be used instead of the address information in the headers, then the address reference units 34 can read the additional information 14 instead of reading the headers. In FIGS. 22 and 23, this means that the headers do not have to be placed on the second part 102 of the shared bus 27.

Several aspects of the invention are applicable even if the cell demultiplexer is not subdivided into master and slave modules . These aspects include the parallel transmission of additional information 14, the staggering of write pulses in the cell multiplexer 20, the grouping of ports to accommodate different data rates, periodic alteration of the multiplexing sequence on the shared bus, and the use of test pattern data to monitor the integrity of the bus.

The integrated circuits employed in the invented ATM cell switch need not be CMOS ICs. Other types of ICs, including gallium-arsenide (GaAs) ICs for example, can be employed.

Those skilled in the art will recognize that further modifications can be made without departing from the scope claimed below.

What is claimed is:

1. An ATM cell switch for routing cells from a plurality of input ports to a plurality of output ports according to headers contained in the cells, comprising:

a certain number of input memories for temporarily storing the cells received from said input ports, before said cells are routed to said input ports, each input port supplying cells to just one of said input memories, a write pulse distributor coupled to said input memories for distributing write pulses to said input memories, causing data of said cells to be written in said input memories; and a pulse distribution controller coupled to said write pulse distributor, for staggering said write pulses so that not more than M of said input memories receive said write pulses simultaneously, where M is a certain positive integer less than the number of input memories.

2. An ATM cell switch for routing cells from a plurality of input ports to a plurality of output ports according to headers contained in the cells, comprising:

a plurality of input memories for temporarily storing the cells received from said input ports, before said cells are routed to said output ports;

a write pulse distributor coupled to said input memories for distributing write pulses to said input memories, causing data of said cells to be written in said input memories; and a pulse distribution controller coupled to said write pulse distributor, for staggering said write pulses so that not more than M write pulses occur at any one time, where M is a certain positive integer, wherein said write pulse distributor comprises a plurality of shift registers, each having a plurality of stages, for shifting write pulses from stage to stage, then out to respective input memories, and a plurality of timing distributors for loading said write pulses into appropriate stages in said shift registers under control of said pulse distribution controller, thereby delaying said write pulses by appropriate amounts.

3. The ATM cell switch of claim 1, wherein additional information pertaining to said cells is generated at said input ports, is written in said input memories at timings determined by said write pulses, and is routed through said ATM cell switch in parallel with respective cells.

4. The ATM cell switch of claim 1, wherein each of said input memories receives cells from a group of said input ports, each group consisting of at least one input port.

5. An ATM cell switch for routing cells from a plurality of input ports having different data rates to a plurality of output ports, also having different data rates, via a shared bus, comprising:

a cell multiplexing memory for storing said cells;

a plurality of input processors coupled to said cell multiplexing memory, each receiving cells from at least one of said input ports, for converting said cells to a uniform data rate and data width and writing said cells into said cell multiplexing memory;

an output sequencer for multiplexing the cells stored in said cell multiplexing memory onto said shared bus; and a plurality of output processors, each coupled to at least one of said output ports, for receiving cells from said shared bus, and sending the cells thus received to appropriate output ports, as specified by header information contained in said cells, at data rates appropriate for those output ports.

6. The ATM cell switch of claim 5, further comprising:

a first port configuration unit for assigning said input processors to respective input ports; and a second port configuration unit for assigning said output processors to respective output ports.

7. The ATM cell switch of claim 5, wherein:

said input processors also receive from respective input ports additional information pertaining to said cells;

said input processors write said additional information into said cell multiplexing memory in parallel with said cells; and said output sequencer multiplexes said additional information onto said shared bus in parallel with said cells.

8. The ATM cell switch of claim 5, wherein said output sequencer multiplexes said cells onto said shared bus by selecting said input processors in a cyclic sequence, and periodically alters said cyclic sequence.

9. The ATM cell switch of claim 5, further comprising:

a write pulse distributor for generating write pulses that control times at which said input processors write said cells into said cell multiplexing memory; and a pulse distribution controller coupled to said write pulse distributor, for staggering said write pulses, so that at most a certain number of said write pulses occur simultaneously.

10. An ATM cell switch for routing cells from a plurality of input ports to a plurality of output ports by multiplexing the cells received from said input ports onto a shared bus in a certain sequence of said input sorts, then demultiplexing said cells from said shared bus to said output ports according to headers contained in the cells, comprising:

an output sequencer for specifying and periodically altering said sequence of said input ports, wherein said output sequencer comprises a counter for receiving a clock signal and a synchronizing signal, selecting said input ports in a cyclic sequence by counting said clock signal, and thereby altering said cyclic sequence by one count in response to said synchronizing signal.

11. The ATM cell switch of claim 10, wherein said counter starts from an initial value, and wherein said output sequencer further comprises an incrementer for periodically incrementing said initial value.

12. The ATM cell switch of claim 10, wherein said counter selects groups of said input ports.

13. The ATM cell switch of claim 11, wherein said counter selects groups of said input ports.

14. The ATM cell switch of claim 10, wherein additional information pertaining to said cells is generated at said input ports and multiplexed onto said shared bus in parallel with respective cells, and is routed through said ATM cell switch in parallel with respective cells.

15. An ATM cell switch for routing cells from a plurality of input ports to a plurality of output ports by multiplexing the cells received from salid input ports onto a shared bus in a certain sequence of said input ports, then demultiplexing said cells from said shared bus to said output ports according to headers contained in the cells, comprising:

a cell multiplexing memory for multiplexing the cells received from said input ports, thereby generating multiplexed data;

a test pattern generator for generating test pattern data;

a selector for selecting said multiplexed data and said test pattern data in turn, and placing the data thus selected on said shared bus; and a plurality of demultiplexers for demultiplexing said multiplexed data and said test pattern data from said shared bus, sending said multiplexed data to respective output ports, and checking said test pattern data to monitor normal transmission of the data on said shared bus.

16. The ATM cell switch of claim 15, wherein said test pattern data comprise a pseudo-random pattern of zero's and one's.

17. The ATM cell switch of claim 15, wherein said test, pattern data comprise a fixed pattern of zero's and one's, with transitions both from zero to one and from one to zero.

18. The ATM cell switch of claim 15, wherein additional information pertaining to said cells is generated at said input ports and multiplexed onto said shared bus in parallel with respective cells, and is routed through said ATM cell switch in parallel with respective cells.

19. An ATM cell switch for routing address information and cell payload data from a plurality of input ports to a plurality of output ports, comprising:

a shared bus consisting of at least a first part and a second part paralleling said first part;

a cell multiplexer coupled to said shared bus, for receiving said address information and cell payload data from said input ports and multiplexing said address information and cell payload data onto said shared bus;

a plurality of master demultiplexer modules coupled to said shared bus, for reading said address information from said shared bus, demultiplexing said cell payload data from said first part of said shared bus according to said address information, and sending said cell payload data to said output ports as specified by said address information; and a plurality of slave demultiplexer modules coupled to said shared bus, for demultiplexing said cell payload data from said second part of said shared bus.

20. The ATM cell switch of claim 19, wherein said address information is contained in headers attached to said cell payload data, and said cell multiplexer has an output sequence converter for rearranging data output by said cell multiplexer so that said headers are placed on said first part of said shared bus.

21. The ATM cell switch of claim 19, wherein said slave demultiplexer modules are control led by said master demultiplexer modules and send the payload data demultiplexed from said second part of said shared bus to said master demultiplexer modules for output to said output ports.

22. The ATM cells switch of claim 19, wherein said slave demultiplexer modules read said address information from said shared bus, and demultiplex said payload data from said second part of said shared bus according to said address information.

23. The ATM cell switch of claim 22, wherein said slave demultiplexer modules send the payload data demultiplexed from said second part, of said shared bus to said master demultiplexer modules for output to said output ports.

24. The ATM cell switch of claim 22, wherein said slave demultiplexer modules send the payload data demultiplexed from said second part, of said shared bus to said output ports as specified by said address information.

25. The ATM cell switch of claim 19, wherein:

said cell multiplexer also places test pattern data on said shared bus; and said master demultiplexer modules and said slave demultiplexer modules check said test pattern data to monitor normal transmission on said shared bus.

26. The ATM cell switch) of claim 19, wherein additional information pertaining to said cells is generated at said input ports and multiplexed onto said shared bus in parallel with respective cells, and is routed through said master demultiplexer modules to said output ports in parallel with said cell payload data.

27. The ATM cell switch of claim 26, wherein said additional information is also routed through said slave demultiplexer modules.

* * * * *